US012365509B2

(12) United States Patent
Humberstone et al.

(10) Patent No.: US 12,365,509 B2
(45) **Date of Patent: *Jul. 22, 2025**

(54) TAMPER-EVIDENT BOX

(71) Applicant: Pratt Corrugated Holdings, Inc., Brookhaven, GA (US)

(72) Inventors: Robert F. Humberstone, Port Charlotte, FL (US); Hector Nava, Dallas, TX (US)

(73) Assignee: Pratt Corrugated Holdings, Inc., Brookhaven, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/967,391

(22) Filed: Dec. 3, 2024

(65) Prior Publication Data

US 2025/0091759 A1 Mar. 20, 2025

Related U.S. Application Data

(63) Continuation of application No. 18/205,401, filed on Jun. 2, 2023, now Pat. No. 12,172,806, which is a (Continued)

(51) Int. Cl.
*B65D 5/66* (2006.01)
*B31B 50/73* (2017.01)
(Continued)

(52) U.S. Cl.
CPC .......... *B65D 5/6685* (2013.01); *B31B 50/734* (2017.08); *B65D 5/18* (2013.01);
(Continued)

(58) Field of Classification Search
CPC ...... B65D 2571/00277; B65D 2215/04; B65D 5/106; B65D 5/6608; B65D 5/665;
(Continued)

(56) References Cited

U.S. PATENT DOCUMENTS 636,806 A 11/1899 Johnstone
916,503 A 3/1909 Thompson
(Continued)

FOREIGN PATENT DOCUMENTS

DE 2846467 5/1980
DE 102008037953 4/2009
(Continued)

OTHER PUBLICATIONS

US D1,036,252 S, 07/2024, Ball (withdrawn)
(Continued)

*Primary Examiner* — Christopher R Demeree
(74) *Attorney, Agent, or Firm* — Taylor Duma LLP

(57) ABSTRACT

A blank can include a first main panel; a locking tab extending from and separable from the first main panel, the locking tab comprising a neck and an ear; a second main panel connected to the first main panel and facing the first main panel; and an end panel extending from the second main panel, the end panel defining a locking opening, the locking opening sized to receive and lockably engage at least a portion of the locking tab upon assembly of the blank into the box; wherein the end panel comprises a second end panel, an inside end panel, and a connecting panel joining the inside end panel to the second end panel, and wherein the locking opening is defined by at least the connecting panel and the inside end panel.

20 Claims, 8 Drawing Sheets

Related U.S. Application Data continuation of application No. 17/001,016, filed on Aug. 24, 2020, now Pat. No. 11,840,379.

(51) Int. Cl.
*B65D 5/18* (2006.01)
*B65D 85/36* (2006.01)
*B31B 120/10* (2017.01)
*B31B 120/30* (2017.01)
*B31B 120/70* (2017.01)

(52) U.S. Cl.
CPC ........ *B65D 85/36* (2013.01); *B31B 2120/102* (2017.08); *B31B 2120/302* (2017.08); *B31B 2120/70* (2017.08); *B65D 2585/366* (2013.01)

(58) Field of Classification Search
CPC ........................... B65D 5/22; B65D 2585/366; B65D 2301/00; B65D 5/42; B65D 5/247; B65D 5/0254
USPC ....... 229/149, 902, 906, 178, 102, 150, 151, 229/148, 125.31, 196, 152; 206/807
See application file for complete search history.

(56) References Cited

U.S. PATENT DOCUMENTS 1,108,464 A 8/1914 Morey
1,277,459 A 9/1918 Myers
1,306,574 A 6/1919 Boerlin
1,470,141 A 10/1923 Bryson
1,530,644 A 3/1925 Blandford
1,765,964 A 6/1930 Berton
1,987,545 A 1/1935 Alexander
2,028,677 A 1/1936 Lupton
2,044,701 A 6/1936 Junkin
2,060,240 A * 11/1936 Pergande .............. B65D 5/106 229/185
2,228,181 A 1/1941 Perryman
2,572,159 A 10/1951 Kells et al.
2,834,531 A 5/1958 Struble
D196,883 S 11/1963 Robinson
3,225,914 A 12/1965 Klein
3,233,818 A 2/1966 Bixler
3,235,167 A 2/1966 Svensson
3,263,899 A 8/1966 Collura et al.
3,356,282 A 12/1967 Layne, Sr.
3,451,535 A 6/1969 Caplan
D214,879 S 8/1969 Roccaforte et al.
3,462,066 A 8/1969 Farquhar
D215,414 S 9/1969 Roccaforte
3,512,823 A 5/1970 D'Esposito
3,580,482 A 5/1971 Witte
3,690,542 A 9/1972 Jernstrom
3,827,624 A 8/1974 Dogliotti
3,949,931 A 4/1976 Hall
4,046,311 A 9/1977 Voytko
4,428,525 A 1/1984 Brauner
4,471,902 A 9/1984 Skaggs
4,516,718 A 5/1985 Forbes
4,600,140 A 7/1986 Milliens
4,607,786 A 8/1986 Weaver
4,752,028 A 6/1988 Ogura
4,765,535 A 8/1988 Michetti
4,830,270 A 5/1989 Holmes
4,953,779 A 9/1990 Densen
5,000,374 A * 3/1991 Deiger ................ B65D 5/2033 229/906
5,139,195 A 8/1992 McClure
5,232,087 A 8/1993 Schluger
5,259,552 A 11/1993 Kuchenbecker
5,263,634 A 11/1993 Korine
5,350,108 A 9/1994 Friar et al.
5,368,225 A 11/1994 Ritter
5,402,929 A 4/1995 Ritter et al.
5,452,845 A 9/1995 Ritter
5,507,428 A 4/1996 Robinson et al.
5,522,538 A * 6/1996 Gray ................... B65D 5/2057 229/149
5,535,940 A 7/1996 Olds
5,722,585 A 3/1998 Redl
5,740,958 A * 4/1998 Cai ......................... B65D 5/10 229/103.1
D394,383 S 5/1998 Bradfield
5,799,864 A 9/1998 Mertz
5,803,345 A 9/1998 Jones et al.
5,875,961 A 3/1999 Stone et al.
5,918,797 A 7/1999 Correll
5,941,453 A 8/1999 Oliff
D432,912 S 10/2000 Lubineau-Bigot et al.
D433,630 S 11/2000 Lubineau-Bigot et al.
6,206,277 B1 3/2001 Correll
6,223,979 B1 5/2001 Correll
6,290,122 B1 9/2001 Correll
D449,520 S 10/2001 Dizoglio, III
6,364,199 B1 4/2002 Rose
6,398,028 B1 * 6/2002 Stovall ................ B65H 37/002 206/390
6,401,971 B1 6/2002 Edwards et al.
6,685,085 B2 2/2004 Hanna
6,715,805 B1 * 4/2004 Ågren ................. B65D 5/4279 292/228
D496,269 S 9/2004 Hutchinson
6,868,964 B2 3/2005 Carty et al.
6,889,891 B2 5/2005 Correll
6,922,976 B2 8/2005 Correll
6,997,372 B2 2/2006 Gasparowicz
D569,719 S 5/2008 Ross
D592,968 S 5/2009 Lee et al.
7,578,393 B2 8/2009 Gillon
D601,419 S 10/2009 Sant' Ana Caceres et al.
D613,153 S 4/2010 Russell
D628,065 S 11/2010 Russell
D649,040 S 11/2011 Sanders
8,162,206 B2 4/2012 Harrelson
8,408,451 B2 4/2013 Adam et al.
D696,107 S 12/2013 Kimple et al.
8,608,050 B2 12/2013 Seliger et al.
D699,101 S 2/2014 Strom et al.
D707,123 S 6/2014 Marchetti et al.
D735,576 S 8/2015 Aldridge
9,327,866 B2 5/2016 Strom et al.
D758,851 S 6/2016 Binder et al.
D764,280 S 8/2016 Carnu
D767,989 S 10/2016 Nietert et al.
9,481,486 B2 11/2016 Nameth et al.
9,522,761 B2 12/2016 Baker et al.
9,694,837 B2 7/2017 Ryan
D798,709 S 10/2017 Chen
9,878,818 B2 1/2018 Grajales et al.
10,017,292 B1 7/2018 Anderson et al.
D831,330 S 10/2018 Kim et al.
10,086,972 B2 10/2018 Hajek
D834,411 S 11/2018 Vanderhulst et al.
10,118,726 B2 11/2018 James et al.
D848,835 S 5/2019 Exner et al.
10,364,062 B2 7/2019 Bressan et al.
D859,984 S 9/2019 Li et al.
D863,958 S 10/2019 Tidwell et al.
D866,312 S 11/2019 Ito
10,486,850 B1 11/2019 Cook et al.
D874,921 S 2/2020 Zhao
D875,521 S 2/2020 Elman
D876,819 S 3/2020 Kim et al.
D888,551 S 6/2020 Kim
D892,632 S 8/2020 Bogdziewicz
10,787,288 B1 9/2020 Garthaffner
D911,833 S 3/2021 Toroyan
D914,495 S 3/2021 Wikstrom
11,180,278 B2 11/2021 Bressan et al.
11,225,354 B2 1/2022 Dixon
11,230,404 B2 1/2022 Sollie et al.
D946,768 S 3/2022 Kemper et al.
11,286,081 B2 3/2022 Collis et al.
11,319,140 B2 5/2022 Modha et al.

(56) References Cited

U.S. PATENT DOCUMENTS

| | | | |
|---|---|---|---|
| D955,875 | S | 6/2022 | Sill et al. |
| 11,377,252 | B2 | 7/2022 | Borst, Sr. et al. |
| D964,851 | S | 9/2022 | Aloisio et al. |
| D965,433 | S | 10/2022 | Wikstrom |
| D968,950 | S | 11/2022 | Sollie et al. |
| 11,511,921 | B1 | 11/2022 | Wikstrom et al. |
| D977,966 | S | 2/2023 | Fang |
| D977,967 | S | 2/2023 | Sollie et al. |
| D981,873 | S | 3/2023 | Valentine |
| 11,661,246 | B2 | 5/2023 | Sill et al. |
| 11,731,800 | B2 | 8/2023 | Borst, Sr. et al. |
| D1,005,097 | S | 11/2023 | Strasser |
| 11,840,379 | B2 | 12/2023 | Humberstone et al. |
| 11,919,686 | B1 | 3/2024 | Jackson et al. |
| 11,939,121 | B2 | 3/2024 | Donschietz et al. |
| 11,945,627 | B2 | 4/2024 | Borst, Sr. et al. |
| 11,993,428 | B2 | 5/2024 | Mayer |
| D1,032,358 | S | 6/2024 | Walters et al. |
| D1,033,214 | S | 7/2024 | Tao et al. |
| D1,037,847 | S | 8/2024 | Borst, Sr. et al. |
| D1,052,397 | S | 11/2024 | Ball |
| 12,162,657 | B2 | 12/2024 | Humberstone et al. |
| 12,172,806 | B2 | 12/2024 | Humberstone et al. |
| D1,056,702 | S | 1/2025 | Ball |
| D1,060,029 | S | 2/2025 | Mayer |
| 2003/0163978 | A1 | 9/2003 | Correll |
| 2005/0103832 | A1 | 5/2005 | Correll |
| 2009/0057387 | A1 | 3/2009 | Tirado Alanis |
| 2011/0136641 | A1 | 6/2011 | Lee et al. |
| 2012/0234904 | A1 | 9/2012 | Costanzo, Jr. |
| 2016/0001937 | A1 | 1/2016 | Skinner |
| 2016/0107785 | A1 | 4/2016 | Sato et al. |
| 2016/0194111 | A1 | 7/2016 | Sharon et al. |
| 2017/0202401 | A1 | 7/2017 | Mortell |
| 2017/0297802 | A1 | 10/2017 | Davis et al. |
| 2017/0297803 | A1 | 10/2017 | Chambers et al. |
| 2017/0313464 | A1 | 11/2017 | McCarthy et al. |
| 2017/0362008 | A1 | 12/2017 | Theodorakos |
| 2018/0170610 | A1 | 6/2018 | Buss |
| 2019/0100346 | A1 | 4/2019 | Bressan et al. |
| 2019/0248536 | A1 | 8/2019 | Foushee |
| 2019/0300224 | A1 | 10/2019 | Jiang et al. |
| 2019/0344927 | A1 | 11/2019 | Ozgercel |
| 2020/0391903 | A1 | 12/2020 | Donschietz et al. |
| 2021/0078755 | A1 | 3/2021 | Sollie et al. |
| 2021/0371153 | A1 | 12/2021 | Borst, Sr. et al. |
| 2022/0017263 | A1 | 1/2022 | Wikstrom |
| 2022/0055794 | A1 | 2/2022 | Humberstone et al. |
| 2022/0289423 | A1 | 9/2022 | Borst, Sr. et al. |
| 2023/0249869 | A1 | 8/2023 | Ball |
| 2023/0249897 | A1 | 8/2023 | Forsberg |
| 2023/0312159 | A1 | 10/2023 | Borst, Sr. et al. |
| 2023/0312164 | A1 | 10/2023 | Humberstone et al. |
| 2023/0312165 | A1 | 10/2023 | Humberstone et al. |
| 2023/0312218 | A1 | 10/2023 | Wu et al. |
| 2023/0331430 | A1 | 10/2023 | Valance |
| 2024/0300692 | A1 | 9/2024 | Donschietz et al. |
| 2024/0336394 | A1 | 10/2024 | Sanders et al. |
| 2025/0051090 | A1 | 2/2025 | Coles |

FOREIGN PATENT DOCUMENTS

| | | |
|---|---|---|
| EP | 0936152 | 12/2003 |
| EP | 1992574 | 11/2008 |
| FR | 2504892 | 11/1982 |
| GB | 472474 | 9/1937 |
| GB | 2227731 | 8/1990 |
| GB | 2305653 | 4/1997 |
| GB | 2328201 | 2/1999 |
| GB | 2456838 | 7/2009 |
| KR | 301122910.0000 | 8/2021 |
| WO | 2013007306 | 1/2013 |

OTHER PUBLICATIONS

Borst Sr., Kendrick Michael; Certificate of Correction for U.S. Appl. No. 16/915,556, filed Jun. 29, 2020, mailed Dec. 20, 2022, 1 pg.

Borst Sr., Kendrick Michael; Notice of Allowance for U.S. Appl. No. 16/915,556, filed Jun. 29, 2020, mailed Mar. 3, 2022, 10 pgs.

Borst Sr., Kendrick Michael; Applicant-Initiated Interview Summary for U.S. Appl. No. 16/915,556, filed Jun. 29, 2020, mailed Aug. 30, 2021, 2 pgs.

Borst Sr., Kendrick Michael; Non-Final Office Action for U.S. Appl. No. 16/915,556, filed Jun. 29, 2020, mailed Jun. 30, 2021, 13 pgs.

Borst Sr., Kendrick Michael; Notice of Allowance for U.S. Appl. No. 16/915,556, filed Jun. 29, 2020, mailed Feb. 3, 2022, 13 pgs.

Borst, Sr., Kendrick Michael; Requirement for Restriction/Election for U.S. Appl. No. 16/915,556, filed Jun. 29, 2020, mailed May 4, 2021, 6 pgs.

trendhunter.com; Article entitled: "Tamper-Proof Pizza Boxes", located at <https://www.trendhunter.com/trends/tamper-proof-pizza-box>, accessed on May 11, 2020, 6 pgs.

Borst Jr., Kendrick Michael; Applicant-Initiated Interview Summary for U.S. Appl. No. 17/830,020, filed Jun. 1, 2022, mailed Feb. 21, 2023, 2 pgs.

Borst Sr., Kendrick Michael; Certificate of Correction for U.S. Appl. No. 17/830,020, filed Jun. 1, 2022, mailed Oct. 15, 2024, 5 pgs.

Borst Sr., Kendrick Michael; Non-Final Office Action for U.S. Appl. No. 17/830,020, filed Jun. 1, 2022, mailed Nov. 28, 2022, 18 pgs.

Borst Sr., Kendrick Michael; Notice of Allowance for U.S. Appl. No. 17/830,020, filed Jun. 1, 2022, mailed Mar. 9, 2023, 9 pgs.

Borst Sr., Kendrick Michael; Certificate of Correction for U.S. Appl. No. 18/207,080, filed Jun. 7, 2023, mailed Dec. 3, 2024, 1 pg.

Borst Sr., Kendrick Michael; Non-Final Office Action for U.S. Appl. No. 18/207,080, filed Jun. 7, 2023, mailed Dec. 15, 2023, 32 pgs.

Borst Sr., Kendrick Michael; Notice of Allowance for U.S. Appl. No. 18/207,080, filed Jun. 7, 2023, mailed Jan. 25, 2024, 5 pgs.

Humberstone, Robert F.; Applicant-Initiated Interview Summary for U.S. Appl. No. 17/001,016, filed Aug. 24, 2020, mailed Jul. 12, 2022, 2 pgs.

Humberstone, Robert F.; Final Office Action for U.S. Appl. No. 17/001,016, filed Aug. 24, 2020, mailed Nov. 15, 2022, 14 pgs.

Humberstone, Robert F.; Non-Final Office Action for U.S. Appl. No. 17/001,016, filed Aug. 24, 2020, mailed May 6, 2022, 31 pgs.

Humberstone, Robert F.; Notice of Allowance for U.S. Appl. No. 17/001,016, filed Aug. 24, 2020, mailed Mar. 6, 2023, 12 pgs.

Humberstone, Robert F.; Requirement for Restriction/Election for U.S. Appl. No. 17/001,016, filed Aug. 24, 2020, mailed Feb. 23, 2022, 6 pgs.

Humberstone, Robert F.; Non-Final Office Action for U.S. Appl. No. 18/205,401, filed Jun. 2, 2023, mailed Dec. 7, 2023, 31 pgs.

Humberstone, Robert F.; Notice of Allowance for U.S. Appl. No. 18/205,401, filed Jun. 2, 2023, mailed Mar. 22, 2024, 9 pgs.

Humberstone, Robert F.; Notice of Allowance for U.S. Appl. No. 18/205,401, filed Jun. 2, 2023, mailed Aug. 13, 2024, 5 pgs.

Humberstone, Robert F.; Non-Final Office Action for U.S. Appl. No. 18/205,403, filed Jun. 2, 2023, mailed Dec. 7, 2023, 29 pgs.

Humberstone, Robert F.; Notice of Allowance for U.S. Appl. No. 18/205,403, filed Jun. 2, 2023, mailed Mar. 22, 2024, 9 pgs.

Humberstone, Robert F.; Notice of Allowance for U.S. Appl. No. 18/205,403, filed Jun. 2, 2023, mailed Aug. 14, 2024, 5 pgs.

Ball, Randy; Non-Final Office Action for U.S. Appl. No. 17/667,199, filed Feb. 8, 2022, mailed Oct. 8, 2024, 64 pgs.

Ball, Randy; Requirement for Restriction/Election for U.S. Appl. No. 17/667,199, filed Feb. 8, 2022, mailed Apr. 30, 2024, 6 pgs.

shpkg.com; Article entitled: "Single Layer Corrugated Box", available at <https://www.shpkg.com/product/Kraft-Sealing-Box-For-Cosmetic.html>, accessed on Sep. 16, 2021, 15 pgs.

Borst Sr., Kendrick Michael; Applicant-Initiated Interview Summary for Design U.S. Appl. No. 29/749,665, filed Sep. 8, 2020, mailed Sep. 28, 2023, 3 pgs.

Borst Sr., Kendrick Michael; Final Office Action for Design U.S. Appl. No. 29/749,665, filed Sep. 8, 2020, mailed Dec. 12, 2023, 15 pgs.

Borst Sr., Kendrick Michael; Non-Final Office Action for Design U.S. Appl. No. 29/749,665, filed Sep. 8, 2020, mailed Jun. 15, 2023, 53 pgs.

(56) References Cited

OTHER PUBLICATIONS

Borst Sr., Kendrick Michael; Notice of Allowance for U.S. Appl. No. 29/749,665, filed Sep. 8, 2020, mailed Mar. 21, 2024, 11 pgs.
Borst Sr., Kendrick Michael; Ex Parte Quayle Action for Design U.S. Appl. No. 29/947,936, filed Jun. 18, 2024, mailed Sep. 30, 2024, 29 pgs.
Boxes Fast Corrugated Cardboard Mailers, posted at Amazon.com on Dec. 12, 2017, [site visited Sep. 7, 2024]. Available from internet, URL: <https://www.amazon.com/Boxes-Fast-BFM LRCD-Corrugated-Cardboard/dp/B0786LQMYL/> (Year: 2017), 2 pgs.
Ireer Pizza Box, posted at Amazon.com on Aug. 16, 2023, [site visited Sep. 7, 2024]. Available from internet, URL: <https://www.amazon.com/Ireer-Corrugated-Cardboard-Takeaway-Shipping/dp/BOCFTPTLWB/> (Year: 2023), 2 pgs.
Cardboard Box: Announced [Apr. 20, 2023; online]. Retrieved [Jun. 16, 2023]. URL: https://www.dreamstime.com/royalty=free-stock-image-cardboaard-box-image21861166 (Year: 2013) 1 pg.
Humberstone, Robert F.; Ex Parte Quayle Action for Design U.S. Appl. No. 29/748,620, filed Aug. 31, 2020, mailed Dec. 19, 2023, 20 pgs.
Humberstone, Robert F.; Non-Final Office Action for U.S. Appl. No. 29/748,620, filed Aug. 31, 2020, mailed Aug. 11, 2023, 55 pgs.
Humberstone, Robert F.; Notice of Allowance for Design U.S. Appl. No. 29/748,620, filed Aug. 31, 2020, mailed Aug. 15, 2024, 5 pgs.
Pizza Pizza. [Date Not Available; online]. Retrieved [Jun. 16, 2023]. URL: https://markets.businessinsider.com/news/stocks/pizza-pizza-delivers-peace-of-mind-with-new-tamper-proof-pizza-box-1029075812 (Year: 2023), 1 pg.
AVI DITI Mailer Box, posted at Amazon.com on Jul. 22, 2010, [site visited Sep. 7, 2023]. Available from internet, URL: <https://www.amazon.com/dp/BOOBT5L TTG/> (Year: 2010).
Ball, Randy; Non-Final Office Action for Design U.S. Appl. No. 29/825,994, filed Feb. 8, 2022, mailed Oct. 6, 2023, 45 pgs.
Ball, Randy; Notice of Allowance for Design U.S. Appl. No. 29/825,994, filed Feb. 8, 2022, mailed Feb. 26, 2024, 10 pgs.
Ball, Randy; Notice of Allowance for Design U.S. Appl. No. 29/825,994, filed Feb. 8, 2022, mailed Sep. 17, 2024, 11 pgs.
amazon.com; Article entitled: Fairlegend Self Sealing Small Corrugated Cardboard Shipping Boxes Mailers 4×3×2 Mailer Boxes for Small Businesses, posted at Amazon.com on Feb. 5, 2021, Available from internet, URL: <https://www.amazon.com/Cardboard-Mailer-Self-Sealing-Shipping-Tear-Off/dp/B08VN GJ BCG> (Year: 2021), 2 pgs.
amazon.com; Article entitled: Aviditi Brown Kraft Literature Mailing Boxes, 11 1-8×8 3/4×4 Inches, Pack of 50, Crush Proof, for Shipping, Mailing, and Storing, posted at Amazon.com on Jul. 22, 2010, 2 pgs.
Ball, Randy; Notice of Allowance for Design U.S. Appl. No. 29/943,344, filed May 21, 2024, mailed Jul. 3, 2024, 8 pgs.
locktheboxes.com; Article entitled: "Lock the Boxes", accessed on May 11, 2020, 6 pgs.
PizzaLoc; Article entitled: "PizzaLoc tamper-evident fastener", located ay <https://www.pizzaloc.com/>, publicly available prior to May 28, 2020, 6 pgs.
Versacube: Announced [Oct. 28, 2021; online]. Retrieved [Jun. 16, 2023]. URL: https://www.oberk.com/containers/plastic/plastic-jug/58240009-5gallon-natural-hdpe-versacube-generic-carton-square--38-400-te-neck (Year: 2021), 1 pg.
Ball, Randy; Final Office Action for U.S. Appl. No. 17/667,199, filed Feb. 8, 2022, mailed Mar. 4, 2025, 12 pgs.
Borst Sr., Kendrick Michael; Notice of Allowance for Design U.S. Appl. No. 29/947,936, filed Jun. 18, 2024, mailed Feb. 12, 2025, 12 pgs.
Ball, Randy; Notice of Allowance for Design U.S. Appl. No. 29/967,735, filed Oct. 11, 2024, mailed Apr. 2, 2025, 38 pgs.
Light Rain Self-adhesive Zipper Carton Box, posted at Amazon.com on Feb. 24, 2023, [site visited Feb. 21, 2025]. Available from internet, URL: <https://www.amazon.com/LIGHT-RAIN-Self-adhesive-Zipper-Business/dp/B0BWRJRLNL> (Year: 2023).
Tear-Off Rectangular Soap Boxes, posted at uxboxes.com (date not available), [site visited Feb. 20, 2025]. Available from internet, URL: <https://uxboxes.com/product/rectangular-box/> (Year: NA) (Year: NA).
Humberstone, Robert F.; Certificate of Correction for U.S. Appl. No. 17/001,016, filed Aug. 24, 2020, mailed May 13, 2025, 1 pg.
Ball, Randy; Notice of Allowance for U.S. Appl. No. 17/667, 199, filed Feb. 8, 2022, mailed May 21, 2025, 12 pgs.

* cited by examiner

TAMPER-EVIDENT BOX

REFERENCE TO RELATED APPLICATIONS

This application is a continuation of U.S. application Ser. No. 18/205,401, filed Jun. 2, 2023, which issued as U.S. Pat. No. 12,172,806 on Dec. 24, 2024, which is a continuation of U.S. application Ser. No. 17/001,016, filed Aug. 24, 2020, which issued as U.S. Pat. No. 11,840,379 on Dec. 12, 2023, each of which is hereby specifically incorporated by reference herein in its entirety.

TECHNICAL FIELD

Field of Use

This disclosure relates to boxes. More specifically, this disclosure relates to folding boxes, each with a tamper-evident locking tab that can be formed integrally with the box from a blank.

Related Art

Boxes are commonly used to store food and other goods. Because boxes are usually discarded after use, especially for relatively inexpensive goods, boxes are typically made from relatively inexpensive materials. Given their low cost, typical boxes such as, for example and without limitation, those used to carry pizza or other food ordered for delivery to a customer location, have no ability to be locked or secured. Without some form of security, however, a delivery person or anyone else with access to the box can open the box and remove some or all of the goods without any evidence of tampering on the outside of the box. When the customer discovers the issue, the delivery person is typically gone.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a blank comprising: a first main panel defining a top outer surface of a box; a locking tab extending from and separable from the first main panel and comprising a first tab subpanel and a second tab subpanel; the first tab subpanel extending from the first main panel and the second tab subpanel extending from the first tab subpanel and joined to the first tab subpanel at a first bend line, the second tab subpanel comprising a neck and an ear, the ear extending from the neck in a lateral direction of the locking tab; a second main panel connected to the first main panel and facing the first main panel; and an end panel extending from the second main panel, the end panel defining a locking opening, a lateral width of the locking tab at the ear being greater than a lateral width of the locking opening, a lateral width of the locking tab at the neck being less than the lateral width of the locking opening, the locking opening sized to receive and lockably engage at least a portion of the locking tab upon assembly of the blank into the box; wherein the locking tab and the locking opening are positioned on opposite ends of the blank, a central axis of each of the locking tab and the locking opening being aligned with each other; and wherein engaged portions of the locking tab and the locking opening are configured to be hidden to an observer outside of the box upon assembly thereof.

In a further aspect, disclosed is a box comprising: a box top comprising a first panel and a locking tab separately joined to the first panel, the locking tab comprising a first tab subpanel and a second tab subpanel; the first tab subpanel extending from the first panel and the second tab subpanel extending from the first tab subpanel, the second tab subpanel comprising a neck and an ear, the ear extending from the neck in a lateral direction of the locking tab; and a box bottom comprising a second panel, the second panel defining a locking opening, a lateral width of the locking tab at the ear being greater than a lateral width of the locking opening, a lateral width of the locking tab at the neck being less than the lateral width of the locking opening, the locking opening sized to receive and capture the locking tab, the locking tab configured to engage an edge of the locking opening and thereby configured to prevent movement of the locking tab with respect to the locking opening in an opening direction of the locking tab; wherein engaged portions of the locking tab and the locking opening are hidden to an observer outside of the box when the box is in an assembled position.

In yet another aspect, disclosed is a blank comprising: a first main panel defining a top outer surface of a box; a locking tab extending from and separable from the first main panel, the locking tab comprising a neck and an ear, the ear extending from the neck in a lateral direction of the locking tab; a second main panel connected to the first main panel and facing the first main panel; and an end panel extending from the second main panel, the end panel defining a locking opening, a lateral width of the locking tab at the ear being greater than a lateral width of the locking opening, a lateral width of the locking tab at the neck being less than the lateral width of the locking opening, the locking opening sized to receive and lockably engage at least a portion of the locking tab upon assembly of the blank into the box; wherein the end panel comprises a second end panel, an inside end panel, and a connecting panel joining the inside end panel to the second end panel, an intersection between the connecting panel and each of the inside end panel and the second end panel defining a bend line; and wherein the locking opening is defined by at least the connecting panel and the inside end panel.

In a further aspect, disclosed is a box comprising: a box top comprising a first panel and a locking tab separably joined to the first panel, the locking tab comprising a neck and an ear, the ear extending from the neck in a lateral direction of the locking tab; and a box bottom comprising a second panel, the second panel defining a locking opening, a lateral width of the locking tab at the ear being greater than a lateral width of the locking opening, a lateral width of the locking tab at the neck being less than the lateral width of the locking opening, the locking opening sized to receive and capture the locking tab, the locking tab configured to engage an edge of the locking opening and thereby configured to prevent movement of the locking tab with respect to the locking opening in an opening direction of the locking tab; wherein the second panel comprises a second end panel, a connecting panel, and an inside end panel; and wherein the locking opening is defined by at least the connecting panel and the inside end panel.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

DETAILED DESCRIPTION

Figure 1:
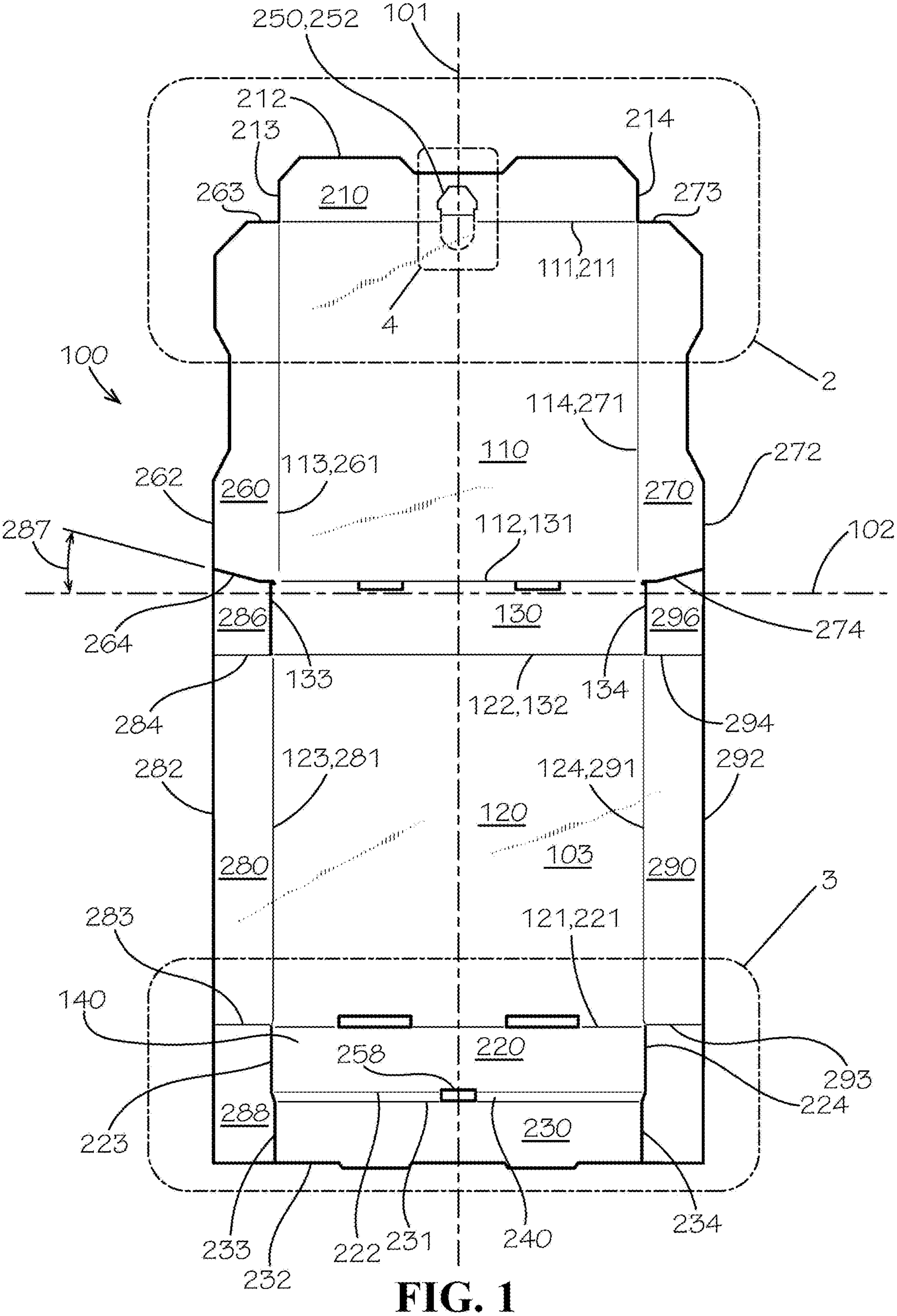
FIG. 1 is a top plan view of a blank for a box in accordance with one aspect of the current disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list. The phrase "at least one of A and B" as used herein means "only A, only B, or both A and B"; while the phrase "one of A and B" means "A or B."

To simplify the description of various elements disclosed herein, the conventions of "left," "right," "front," "rear," "top," "bottom," "upper," "lower," "inside," "outside," "inboard," "outboard," "horizontal," and/or "vertical" may be referenced. Unless stated otherwise, "front" describes that end of a blank or an assembled box or any portion thereof nearest to a primary or initial point of opening; "rear" is that end of the blank or the assembled box or any portion thereof that is opposite or distal the front; "left" is that which is to the left of or facing left from a person facing towards the front; and "right" is that which is to the right of or facing right from that same person facing towards the front. "Horizontal" or "horizontal orientation" describes that which is in a plane extending from left to right and aligned with the horizon. "Vertical" or "vertical orientation" describes that which is in a plane that is angled at 90 degrees to the horizontal.

In one aspect, a locking device for a box and associated methods, systems, devices, and various apparatuses are disclosed herein. In one aspect, the locking device can comprise a locking tab. In one aspect, the locking device can comprise a panel defining a locking opening engagable or configured to engage with the locking tab.

As disclosed in the figures disclosing a blank 100, various line thicknesses and types can indicate certain characteristics of the geometry. In some aspects, a thicker solid line can indicate the edge of a part; a thinner solid line can indicate a bend line; a dash or dashed line can indicate a hidden edge (and edge covered by other geometry), a perforated cut or connection, or a boundary or boundaries of a detail view; a dot-dash line can indicate material that is cut away and not shown for clarity, and a double dot-dash line can indicate a boundary or boundaries of separately claimable elements. Unless otherwise specified, a geometric center of any thicker lines determine the shape and position of the disclosed geometry. Any dimensions disclosed in the figures are exemplary only, and it is contemplated that the blank 100 and a box 1000 formed therefrom can be any shape and size. In some aspects, for example and without limitation, the box 1000 can be used for delivery of a food such as pizza or other consumer goods such as clothing. In other aspects, the box 1000 can enclose any goods needing to be shipped and/or stored in a protective container.

FIG. 1 shows a top plan view of the blank 100 for the box 1000 (shown in FIG. 9) in accordance with one aspect of the current disclosure. The blank 100 can define an inner surface or first side surface 103 and an outer surface or second side surface 104 (shown in FIG. 6). The blank 100 can comprise a first main panel 110. In some aspects, the blank 100 can further comprise a second main panel 120.

The first main panel 110 can define a first end 111, a second end 112, a third end 113, and a fourth end 114. As shown, the second end 112 can be distal from the first end 111, and the fourth end 114 can be distal from the third end 113. In some aspects, as shown, the first main panel 110 can define a rectangular and, more specifically, a square shape. In other aspects, the first main panel 110 can define a non-rectangular shape such as polygonal shape with fewer than four or more than four sides or ends 111, 112, 113, 114 or even a circular or other rounded shape. Adjacent ends such as the ends 111,113, the ends 113,112, the ends 112,114, and the ends 114,111, can intersect at corners of the first main panel 110.

The second main panel 120 can define a first end 121, a second end 122, a third end 123, and a fourth end 124. As shown, the second end 122 can be distal from the first end 121, and the fourth end 124 can be distal from the third end 123. In some aspects, as shown, the second main panel 120 can define a rectangular and, more specifically, a square shape. In other aspects, the second main panel 120 can define a non-rectangular shape such as polygonal shape with fewer than four or more than four sides or ends 111, 112, 113, 114 or even a circular or other rounded shape. Adjacent ends such as the ends 121,123, the ends 123,122, the ends 122,124, and the ends 124,121, can intersect at corners of the second main panel 120.

A connecting panel 130 can extend from the first main panel 110 to the second main panel 120. More specifically, as shown, the connecting panel 130 can extend from the second end 112 of the first main panel 110 to the second end 122 of the second main panel 120. The connecting panel 130 can thereby be joined to each of the first main panel 110 and the second main panel 120. The connecting panel 130 can define a first end 131, a second end 132, a third end 133, and a fourth end 134. As shown, the second end 132 can be distal from the first end 131, and the fourth end 134 can be distal from the third end 133. In some aspects, as shown, the connecting panel 130 can define a rectangular shape and, in some aspects, a square shape. Adjacent ends such as the ends 131,133, the ends 133,132, the ends 132,134, and the ends 134,131, can intersect at corners of the connecting panel 130.

The blank 100 can comprise a first end panel 210, which can extend from the first main panel 110. More specifically, as shown, the first end panel 210 can extend from the first end 111 of the first main panel 110. The first end panel 210 can thereby be joined to the first main panel 110. The first end panel 210 can define a first end 211, a second end 212, a third end 213, and a fourth end 214. As shown, the second end 212 can be distal from the first end 211, and the fourth end 214 can be distal from the third end 213. In some aspects, as shown, the first end panel 210 can define a rectangular shape and, in some aspects, a square shape. Adjacent ends such as the ends 211,213, the ends 213,212, the ends 212,214, and the ends 214,211, can intersect at corners of the first end panel 210. In some aspects, any of the panels of the blank 100 and the box 1000 that are described as being rectangular can be substantially rectangular (i.e., rectangular in shape minus any notches, chamfers, or other edge treatments). In some aspects, any of the panels of the blank 100 and the box 1000 that are described as being or defining some non-rectangular shape can be substantially that shape (i.e., that shape minus any notches, chamfers, or other edge treatments).

As will be described in further detail below, the blank 100—and the assembled box 1000—can comprise a locking device 250, which can comprise a locking tab 252 and can define a locking opening 258. More specifically, the first end panel 210 can define the locking tab 252.

The blank 100 can comprise an end panel 140, which can comprise one or more of a second end panel 220, an inside end panel 230, and a connecting panel 240. More specifically, The second end panel 220 can extend from the second main panel 120. More specifically, as shown, the second end panel 220 can extend from the first end 121 of the second main panel 120. The second end panel 220 can thereby be joined to the second main panel 120. The second end panel 220 can define a first end 221, a second end 222, a third end 223, and a fourth end 224. As shown, the second end 222 can be distal from the first end 221, and the fourth end 224 can be distal from the third end 223. In some aspects, as shown, the second end panel 220 can define a rectangular shape and, in some aspects, a square shape. Adjacent ends such as the ends 221,223, the ends 223,222, the ends 222,224, and the ends 224,221, can intersect at corners of the second end panel 220.

The blank 100—and, again, the end panel 140—can comprise the inside end panel 230, which can also be a third end panel and can extend from or be connected to the second end panel 220. More specifically, as shown, the inside end panel 230 can extend from or be connected to the second end 222 of the second end panel 220. As will be described in further detail below, the connecting panel 240 can join the second end panel 220 and the inside end panel 230. The inside end panel 230 can thereby be joined to one of the second end panel 220 and the connecting panel 240. The inside end panel 230 can define a first end 231, a second end 232, a third end 233, and a fourth end 234. As shown, the second end 232 can be distal from the first end 231, and the fourth end 234 can be distal from the third end 233. In some aspects, as shown, the inside end panel 230 can define a rectangular shape and, in some aspects, a square shape. Adjacent ends such as the ends 231,233, the ends 233,232, the ends 232,234, and the ends 234,231, can intersect at corners of the inside end panel 230.

The blank 100 can comprise side panels extending from either or both of the first main panel 110 and the second main panel 120. More specifically, as shown, the blank 100 can comprise a side panel 260, which can extend from the third end 113 of the first main panel 110; and a side panel 270, which can extend from the fourth end 114 of the first main panel 110. The side panels 260,270 can define respective first ends 261,271, second ends 262,272, third ends 263,273, and fourth ends 264,274. As shown, the second ends 262, 272 can be distal from the respective first ends 261,271, and the fourth ends 264,274 can be distal from the respective third ends 263,273. In some aspects, as shown, either or both of the side panels 260,270 can define a rectangular shape and, in some aspects, a square shape. Adjacent ends such as the ends 261,263, the ends 263,262, the ends 262,264, the ends 264,261, the ends 271,273, the ends 273,272, the ends 272,274, and the ends 274,271 can intersect at corners of the side panels 260,270.

Similarly, as shown, the blank 100 can comprise a side panel 280, which can extend from the third end 123 of the second main panel 120; and a side panel 290, which can extend from the fourth end 124 of the second main panel 120. The side panels 280,290 can define respective first ends 281,291, second ends 282,292, third ends 283,293, and fourth ends 284,294. As shown, the second ends 282,292 can be distal from the respective first ends 281,291, and the fourth ends 284,294 can be distal from the respective third ends 283,293. In some aspects, as shown, either or both of the side panels 280,290 can define a rectangular shape and, in some aspects, a square shape. Adjacent ends such as the ends 281,283, the ends 283,282, the ends 282,284, the ends 284,281, the ends 291,293, the ends 293,292, the ends 292,294, and the ends 294,291 can intersect at corners of the side panels 280,290.

The blank 100 can comprise a bending tab, which can be a panel, extending from one of the first main panel 110, the second main panel 120, and the connecting panel 130. More specifically, as shown, the blank 100 can comprise a bending tab 286, which can extend from the fourth end 284 of the side panel 280; and a bending tab 296, which can extend from the fourth end 294 of the side panel 290. The bending tabs 286,296 can define respective first ends, second ends, third ends, and fourth ends. As shown, the second ends can be distal from the respective first ends, and the fourth ends can be distal from the respective third ends. In some aspects, as shown, the bending tabs 286,296 can define a polygonal shape and, more specifically, a trapezoidal shape. The fourth ends 264,274 of the respective side panels 260,270 and corresponding or adjacent edges of the bending tabs 286,296 can be angled at an exemplary angle 287 with respect to a transverse axis 102 to facilitate, for example and without limitation, assembly of the box 1000. The third ends 263,273 can be similarly angled as desired for similar reasons. In other aspects, either or both of the bending tabs 286,296 can define a rectangular shape and, in some aspects, a square shape. Adjacent ends of the bending tabs 286,296 can intersect at corners of the bending tabs 286,296.

Similarly, as shown, the blank 100 can comprise a bending tab 288, which can extend from the third end 283 of the side panel 280; and a bending tab 298, which can extend from the third end 293 of the side panel 290. As described below with respect to FIG. 3, the bending tabs 288,298 can define various ends and insertion tabs.

Figure 2:
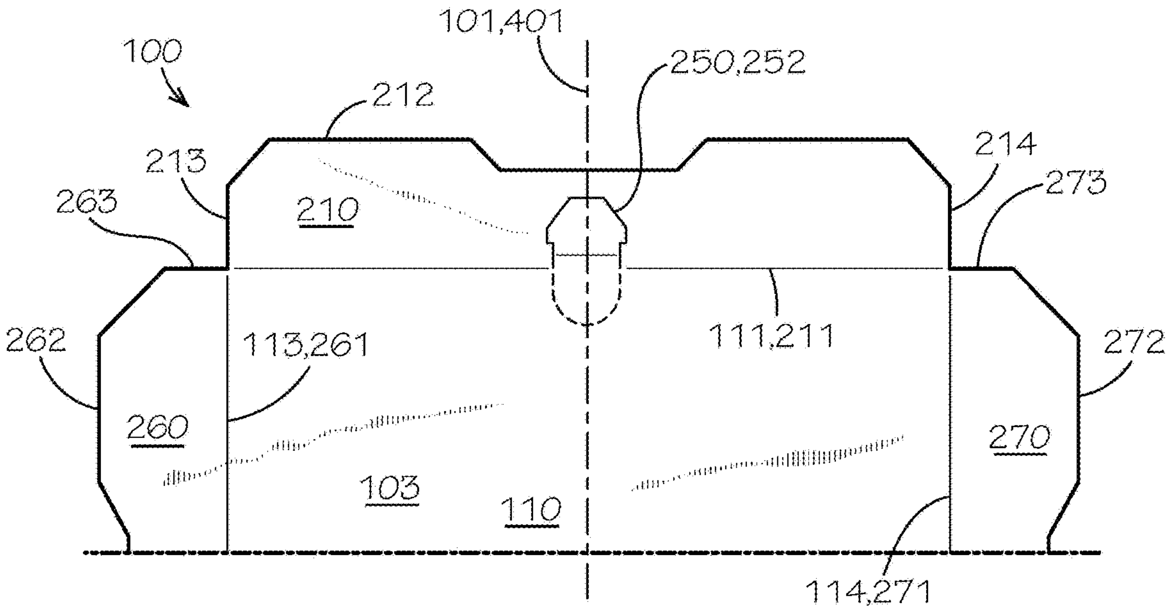
FIG. 2 is a detail view of a first end of a second main panel and surrounding structure of the blank of FIG. 1 taken from detail 2 of FIG. 1 and defining a locking tab.

FIG. 2 is a detail view of the first end 111 of a first main panel 110 and surrounding structure of the blank 100 of FIG. 1 taken from detail 2 of FIG. 1 and defining the locking device 250 comprising the locking tab 252. One of the first main panel 110 and the first end panel 210 can define a pull tab (not shown), which can be used to facilitate, for example and without limitation, opening of the assembled box 1000 (shown in FIG. 9). In some aspects, the pull tab can define a semicircular shape. In some aspects, the pull tab can define another shape or can be absent from the blank 100 and the box 1000 and the box 1000 opened without the pull tab. In some aspects, as shown, a central axis 401 defined by the locking tab 252 can be parallel to and, optionally, aligned with a longitudinal axis 101 of the blank 100, which can be aligned with a centerline of the blank 100, a centerline of the box 1000, and the central axis 401 as shown. The central axis 401 can itself be aligned with a centerline of the locking tab 252. In other aspects, the central axis 401 can be offset from the longitudinal axis 101 of the blank 100 by an offset distance (not shown).

Figure 3:
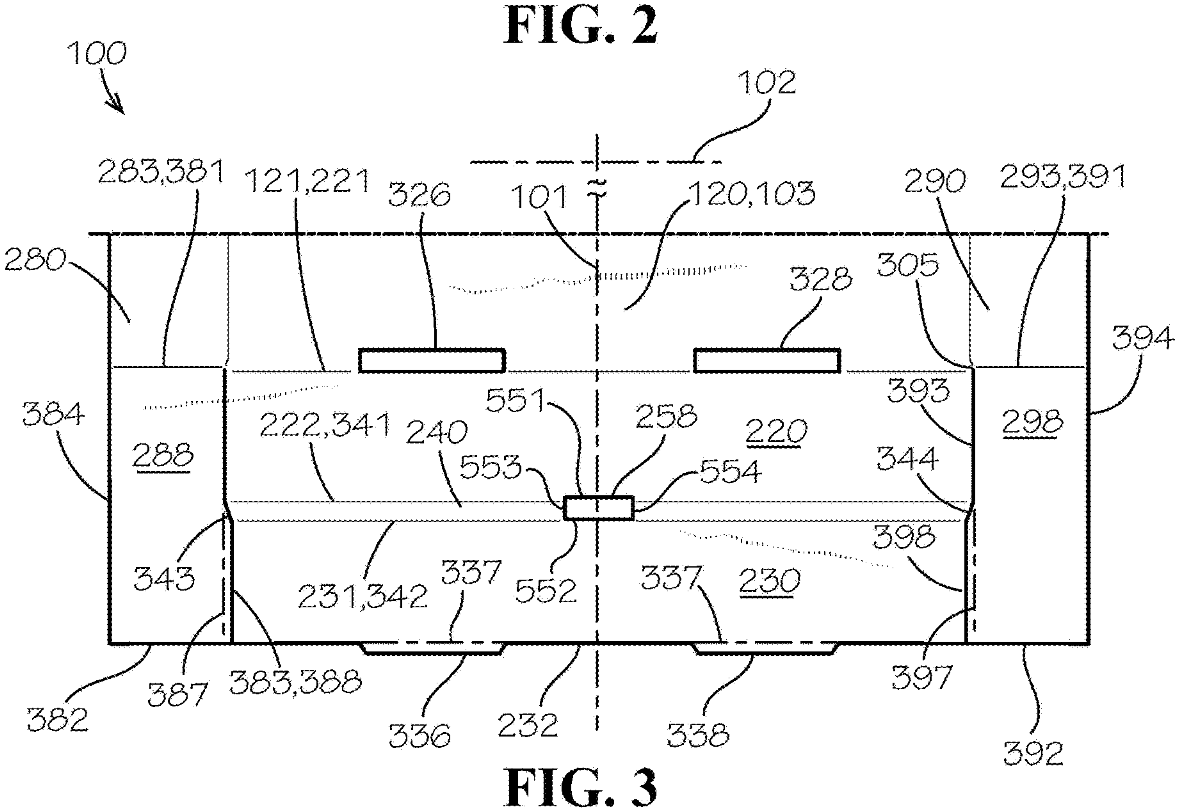
FIG. 3 is a detail view of a first end of a first main panel and surrounding structure of the blank of FIG. 1 taken from detail 3 of FIG. 1 and defining a locking opening.

FIG. 3 is a detail view of the first end 121 of the second main panel 120 and surrounding structure of the blank 100 of FIG. 1 taken from detail 3 of FIG. 1. The bending tabs 288,298 can define respective first ends 381,391, second ends 382,392, third ends 383,393, and fourth ends 384,394. As shown in FIG. 3, the second ends 382,392 can be distal from the respective first ends 381,391, and the fourth ends 384,394 can be distal from the respective third ends 383,393.

The bending tabs 288,298 can comprise insertion tabs 388,398 to facilitate, for example and without limitation, assembly of the box 1000. As shown, the insertion tabs 388,398 can extend from an outline or perimeter of the bending tabs 288,298, which can be represented by the respective ends 381, 382, 383, 384 or 391, 392, 393, 394 and insertion tab baselines 387,397 shown.

In some aspects, as shown, the bending tabs 288,298 can define a polygonal shape and, more specifically, a rectangular shape, including when considering the insertion tab baselines 387,397. In other aspects, either or both of the bending tabs 286,296 can define another shape. Adjacent ends such as the ends 381,383, the ends 383,382, the ends 382,384, the ends 384,381, the ends 391,393, the ends 393,392, the ends 392,394, and the ends 394,391 can intersect at corners of the bending tabs 288,298.

The blank 100 can further define insertion tabs 336,338, which can extend from an end of a panel of the blank 100. More specifically, as shown, the insertion tabs 336,338 can extend from the second end 232 or from an insertion tab baseline 337 of the inside end panel 230.

The blank 100 can define openings, which can be sized to receive and capture or hold an insertion tab such as one or more of the insertion tabs 388,398 during assembly of the box 1000, the locking tab 252 during use and, more specifically, closure of the box 1000, and a finger of a user during use and, more specifically, opening of the box 1000.

More specifically, the blank 100 can define an opening 326, which can be sized to receive the insertion tab 388 and the insertion tab 336; and an opening 328, which can be sized to receive the insertion tab 398 and the insertion tab 338. The blank 100 can define the aforementioned locking opening 258, which can be sized to receive the locking tab 252 during use and, more specifically, closure of the box 1000. More specifically, as shown, a panel of the blank 100 such as the connecting panel 240 or one or more of the second end panel 220 and the inside end panel 230 can define the locking opening 258. The locking opening 258 itself can be or can define a closed shape and can be centered about and symmetrical about a central axis 501 (shown in FIG. 5) of the locking opening 258. More specifically, the locking opening 258 can define a first end 551, a second end 552 distal from the first end 551, a third end 553, and a fourth end 554 distal from the third end 553.

In some aspects, as shown, any of the openings 258, 326, 328 can be an elongated hole. In some aspects, as shown, the locking opening 258 can define a rectangular shape. In some aspects, any of the openings 258, 326, 328 can define another shape. In some aspects, as shown, any of the openings 258, 326, 328 can extend from the inner surface 103 to the outer surface 104 (shown in FIG. 6) of the blank 100, i.e., through a full thickness of the blank 100. In some aspects, openings such as the openings 326,328 need not extend through a full thickness of the blank 100. In some aspects, any of the openings 258, 326, 328, can be aligned along or symmetrical about the longitudinal axis 101, the transverse axis 102, or one of the aforementioned ends of the aforementioned panels. In some aspects, an edge of the any of the openings 258, 326, 328 can be substantially aligned with an edge of one of the aforementioned panels. More specifically, an edge of the openings 326,238 closest to the first end 221 of the second end panel 220 can be substantially aligned or fully aligned with the first end 221. Similarly, edges of the locking opening 258 closest to the first end 341 and the second end 342 of the connecting panel 240 and corresponding ends of the second end panel 220 and the inside end panel 230 can be substantially aligned or fully aligned with the respective ends 341,342. As shown, an offset distance between a particular common reference point 305 on the blank 100 or the assembled box 1000 and a center of the locking opening 258 can match or be equal to half a width of the assembled box.

The blank 100 can define the connecting panel 240. The connecting panel 240 can extend from the second end panel 220 to the inside end panel 230. More specifically, as shown, the connecting panel 240 can extend from the second end 222 of the second end panel 220 to the first end 231 of the inside end panel 230. The connecting panel 240 can thereby be joined to each of second end panel 220 and the inside end panel 230. The connecting panel 240 can define a first end 341, a second end 342, a third end 343, and a fourth end 344. As shown, the second end 342 can be distal from the first end 341, and the fourth end 344 can be distal from the third end 343. In some aspects, as shown, the connecting panel 240 can define a rectangular or substantially rectangular shape and, in some aspects, a square shape. Adjacent ends such as the ends 341,343, the ends 343,342, the ends 342,344, and the ends 344,341, can intersect at corners of the connecting panel 240.

The connecting panel 240 can be sized such that a distance between the second end panel 220 and the inside end panel 230 in the assembled box 1000 is sufficient to receive the respective bending tab 288,298 on each side of the box 1000 and also the locking tab 252 when folded over as will be described below.

Figure 4:
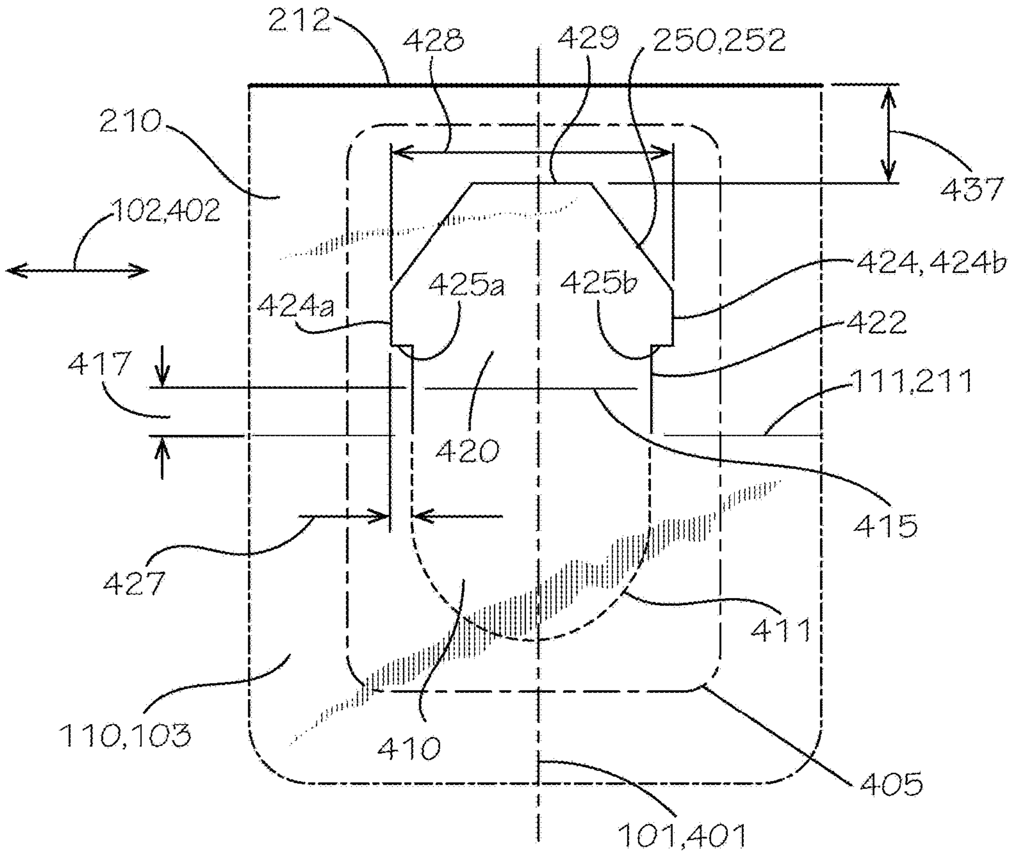
FIG. 4 is a detail view of the locking tab of FIG. 2 taken from detail 4 of FIG. 1.

FIG. 4 is a detail view of the locking tab 252 of FIG. 2 taken from detail 4 of FIG. 1. In some aspects, the locking tab 252 can extend from and be joined to the first end panel 210. In some aspects, the locking tab 252 can extend from and be joined to the first main panel 110. In some aspects, a portion of the locking tab 252 can extend from and be joined to the first main panel 110 and a portion of the locking tab 252 can extend from and be joined to the first end panel 210. As shown, the locking tab 252 can be centered about and symmetrical about the central axis 401 of the locking tab 252.

The locking tab 252 can comprise a first tab subpanel 410 and a second tab subpanel 420. The first tab subpanel 410 can extend similarly from a surrounding panel or panels as the overall locking tab 252 extends from the surrounding panel or panels. For example and without limitation, the first tab subpanel 410 can extend from the first main panel 110. The second tab subpanel 420 can extend from the first tab subpanel 410 and be joined to the first tab subpanel 410 at a bend line 415 defined therebetween. Each of the first tab subpanel 410 and the second tab subpanel 420 can define a first end, a second end, a third end, and a fourth end. As shown, the first tab subpanel 410 can be joined at least in part to a panel such as the first main panel 110 with a perforated connection 411 to facilitate later removal of the locking tab 252 during use and, more specifically, opening of the box 1000. As such, the first tab subpanel 410 can be a punch-out tab configured to break free from the first main panel 110 upon lifting of the main panel 110. A remainder of the locking tab 252 can be fully cut or separated from the surrounding panel or panels.

In some aspects, as shown, the locking tab 252 can define a rectangular shape with corners at intersecting ends of the first tab subpanel 410 and the second tab subpanel 420 defining a radius, a chamfer, or similar corner treatment. The locking tab 252 can define a neck 422 and an ear portion 424 defining ears 424*a,b*, which can extend from the neck 422 in a lateral direction 402 of the locking tab 252 and can define one or more shoulders 425*a,b*. The shoulders 425*a,b* can define an individual shoulder width or shoulder distance 427 and a lateral width 428 of the locking tab 252 at the ears 424*a,b*, which can be measured along the transverse axis 102 of the blank 100. As shown, the lateral width 428 of the locking tab 252 at the ears 424*a,b*, which can define a maximum lateral width 428 of the locking tab 252, can be greater than a lateral width 528 (shown in FIG. 5) of the locking opening 258, and the lateral width 428 of the locking tab 252 at the neck 422 can be less than the lateral width 528 of the locking opening 258. The locking opening 258 can thereby be sized to receive and lockably engage at least a portion of the locking tab 252 upon assembly of the blank 100 into the box 1000. As shown, the bend line 415 can be offset from a bend line defined between the first main panel 110 and the first end panel 210 by an offset distance 417. A distal edge or distal end 429 of the locking tab 252 and, more specifically, the second tab subpanel 420, can be offset from the second end 212 of the first end panel 210 by an offset distance 437. As shown, the distal end 429 of the locking tab 252 can be truncated or flat. As also shown, the distal end 429 of the locking tab 252 and, more specifically, an edge of the distal end 429 can be parallel to the bend line 415 and can define a length.

As shown, any of the aforementioned panels can be joined to adjacent panels with or at bend lines defined by the intersections shown. Furthermore, any of the aforementioned panels can be a flange or a flap. Any of the aforementioned panels can further facilitate, for example and without limitation, rigidity of the box 1000 and portions thereof by preventing or limiting deformation of the first main panel 110, the second main panel 120, and other portions of the box 1000 when loaded by a force resulting from a weight of contents of the box 1000 or external forces applied thereto.

As shown, any of the aforementioned panels can define an exemplary radii R (shown in FIG. 2), chamfer, or other corner treatment at intersecting ends, edges, or corners. Any of the aforementioned panels can be planar. Any of the aforementioned edges can be aligned with one of the longitudinal axis 101 (shown in FIG. 1) and the transverse axis 102 of the blank 100. Any of the aforementioned features of the blank 100, including the locking device 250, can be symmetrical about the longitudinal axis 101 on the blank 100 or in the assembled box 1000 or about the local central axes 401,501.

As shown, one or more edges or entire sides or even all sides of the blank 100 can be substantially aligned (i.e., aligned except for the insert tabs, corner radii or chamfers, and sloped or angled ends) or fully aligned, i.e., collinear. Such substantial alignment can improve utilization of material from which the blank 100 is cut or, in the case of full alignment, increase material utilization to near 100% not considering openings from which scrap material can be nonetheless cut and removed.

Figure 5:
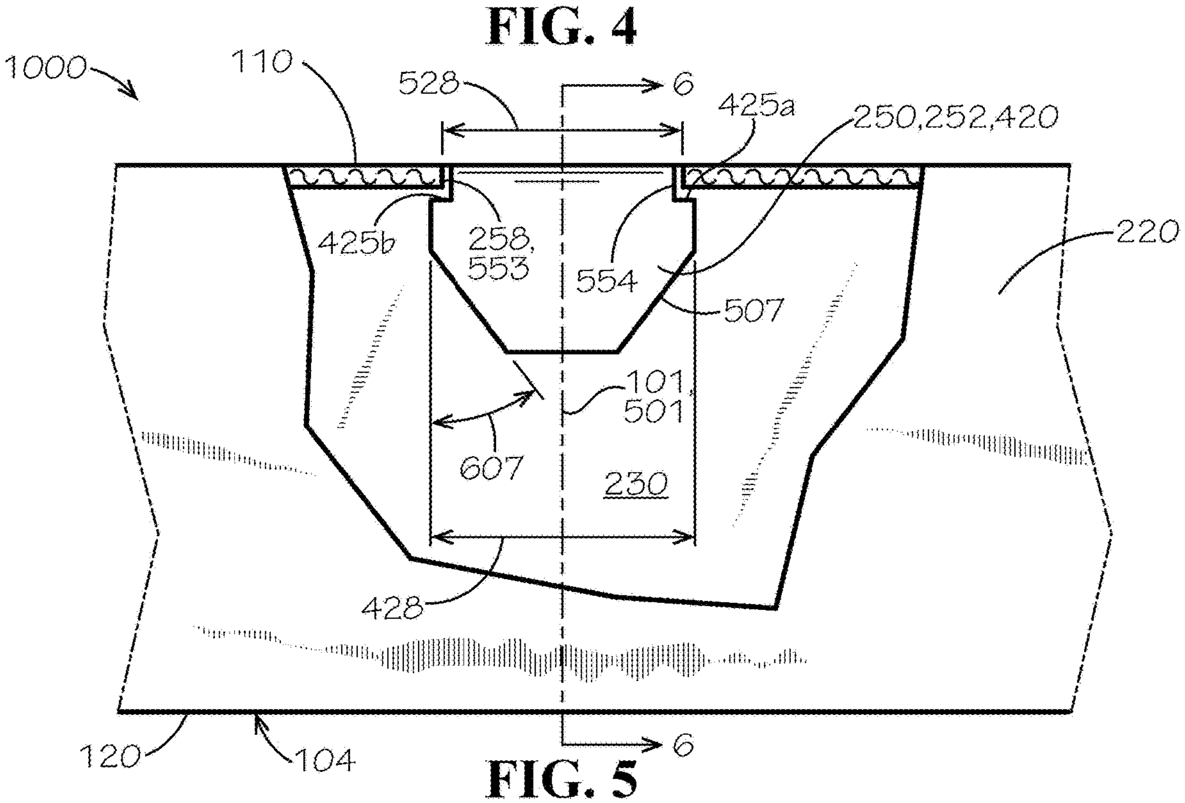
FIG. 5 is a detail front partial cutaway view of an assembled box formed from the blank of FIG. 1 showing the locking tab of FIG. 2 in a bent condition and engaged with the locking opening of FIG. 3.

FIG. 5 is a detail front partial cutaway view of the assembled box 1000 formed from the blank 100 of FIG. 1 showing the locking tab 252 of FIG. 2 engaged with the locking opening 258. As shown, the locking opening 258 can be sized to receive and capture the locking tab 252 and, more specifically, at least a portion of the second tab subpanel 420 of the locking tab 252. The tab subpanels 410,420 of the locking tab 252 can be bent relative to each other. More specifically the second tab subpanel 420 can be bent relative to the first tab subpanel 410. As shown, the shoulders 425*a,b* of the second tab subpanel 420 of the locking tab 252 can be configured to engage an edge or end such as the third end 553 and the fourth end 554 of the locking opening 258 when the second tab subpanel 420 and at least portions of the end panel 140 such as, for example and without limitation, the second end panel 220 and the inside end panel 230 are substantially parallel (i.e., parallel or nearly parallel to the degree required to fit together) —and in close proximity. The lateral widths 428,528 can thereby be configured to prevent movement of the locking tab 252 with respect to the locking opening 258 in an opening direction of the locking device 250 and the box 1000. As shown, a taper 507 defined at an end of the bent locking tab 252 can define a taper angle 607 on one or both sides of the locking tab 252 and can facilitate insertion of the locking tab 252 into the locking opening 258. The shape of the neck 422 and the ears 424*a,b* can be different than shown.

Figure 6:
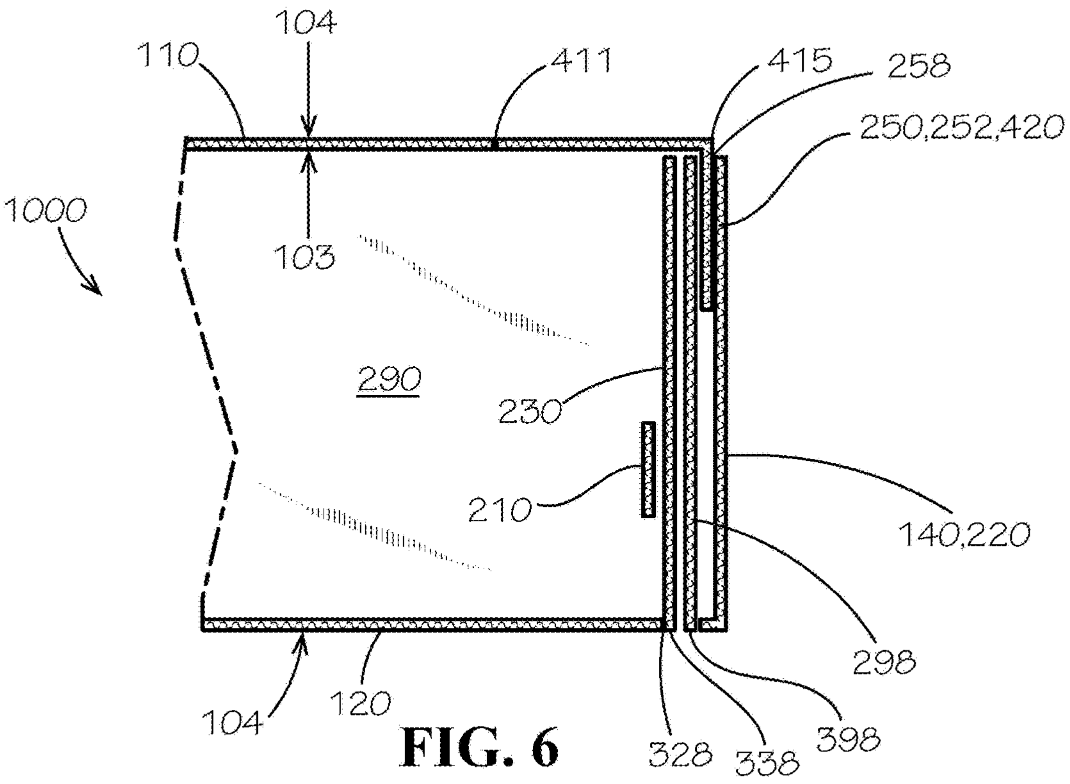
FIG. 6 is a sectional view of the assembled box of FIG. 5 at a centerline of a locking device comprising the locking tab of FIG. 2 and a panel defining the locking opening of FIG. 3 taken along line 6-6 of FIG. 5.
Figure 13:
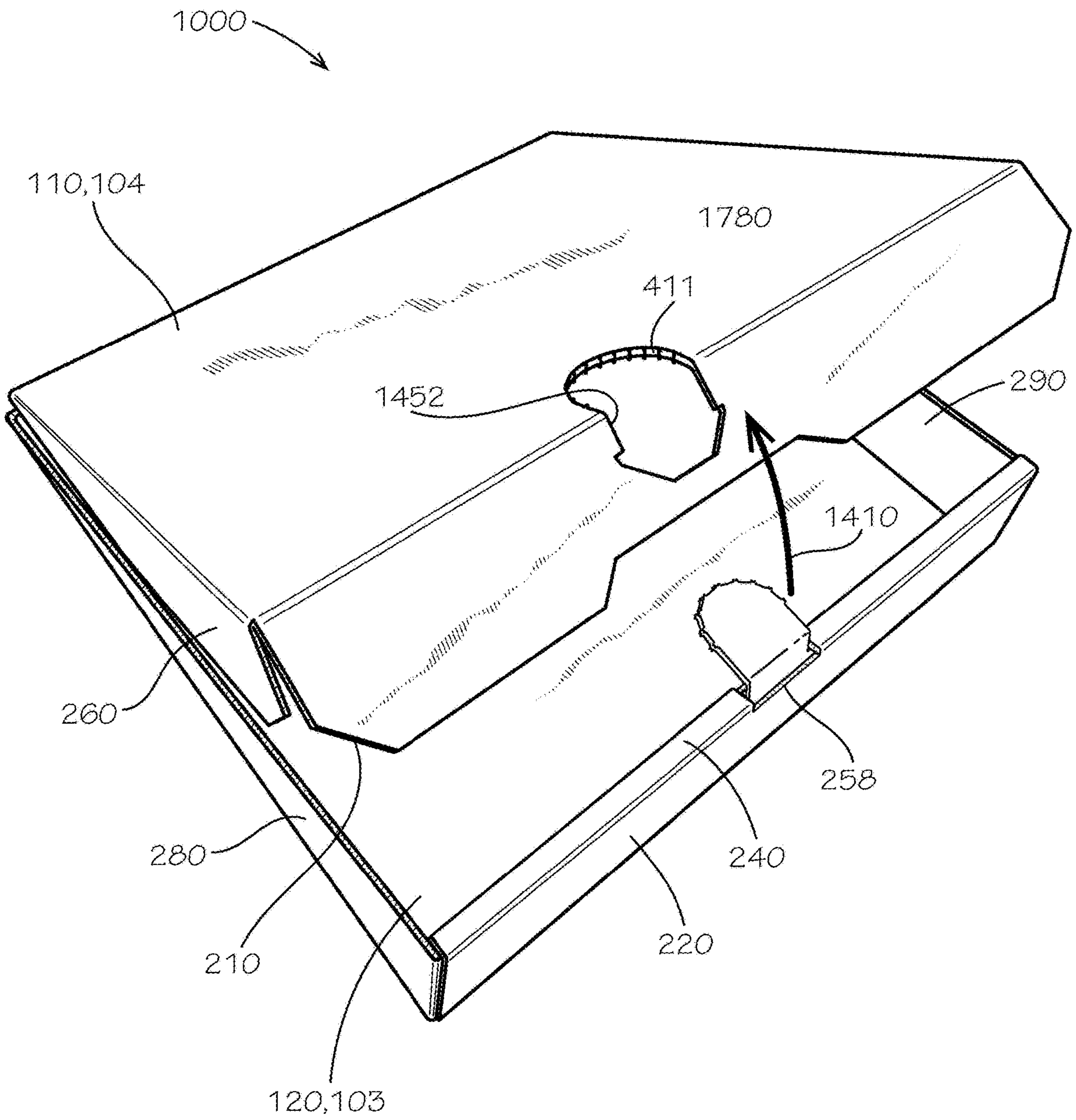
FIG. 13 is a perspective view of the assembled box of FIG. 9 showing the locking device of FIG. 6 after separation of the locking tab from the first main panel.

FIG. 6 is a sectional view of the assembled box 1000 of FIG. 5 at the centerline of the locking device 250 comprising the locking tab 252 of FIG. 2 and a panel such as the end panel 140 defining the locking opening 258. The locking tab 252 and, more specifically, the second tab subpanel 420 of the locking tab 252 is shown engaged with the locking opening 258 in a closed position of the box 1000. Such engagement prevents upward movement of the first main panel 110 relative to the second main panel 120 without damage to the box 1000 such as by tearing of the locking tab 252 from the box 1000 at, in some aspects, the perforated connection 411 (shown also in FIG. 4) as shown in FIG. 13. In some aspects, the strength of the locking device 250, i.e., the connection between the locking tab 252 and the panel defining the locking opening 258 can be adjusted by increasing or decreasing a difference between the lateral widths 428,528 and otherwise adjusting the locking device 250 to respectively strengthen or weaken the connection.

As shown, the insertion tab 398 of the bending tab 298 and one of the insertion tabs 338 of the inside end panel 230 can be received within the opening 328. Similarly, the insertion tab 388 (shown in FIG. 3) of the bending tab 288 (shown in FIG. 3) and another of the insertion tabs 338 of the inside end panel 230 can be received within the opening 326 (shown in FIG. 3). A distal or bottom end of each of the insertion tabs 338, 388, 398 can be substantially co-planar (i.e., flush or nearly flush) with the outer surface 104 of the second main panel 120. In some aspects, part tolerances and other manufacturing or assembly considerations may not make the parts exactly flush in every instance, but it can be desirable to main a substantially co-planar relationship to avoid a situation where the insertion tabs 338, 388, 398 extend so far beyond the second main panel 120 that the insertion tabs 338, 388, 398 interfere with use of the box 1000.

The second tab subpanel 420 can be bent with respect to the first tab subpanel 410 towards the outer surface 104 about the bend line 415. As shown here and in FIG. 11, the second tab subpanel 420 can be bent down and towards the second main panel 120 to substantially match an orientation of the end panels 220,230 in the assembled box 1000.

As described in some aspects above, an entirety of the box 1000 can be formed from the blank 100 and, more specifically, can be formed from the monolithic (i.e., one-piece) blank 100 without tearing any portion of the blank 100 from any other portion thereof.

In some aspects, portions of the box 1000 can be formed from more than one blank. A box top can comprise the first main panel 110 and the first end panel 210, including the locking tab 252 and extending from an end of the first main panel 110, and can be formed from a first blank; and a box bottom can comprise the second main panel 120 and the second end panel 220 and can be formed from a second blank. In other aspects, the box top and the box bottom and as many as all of the structural elements shown in FIG. 1 can be formed from a single blank 100 of material.

Figure 7:
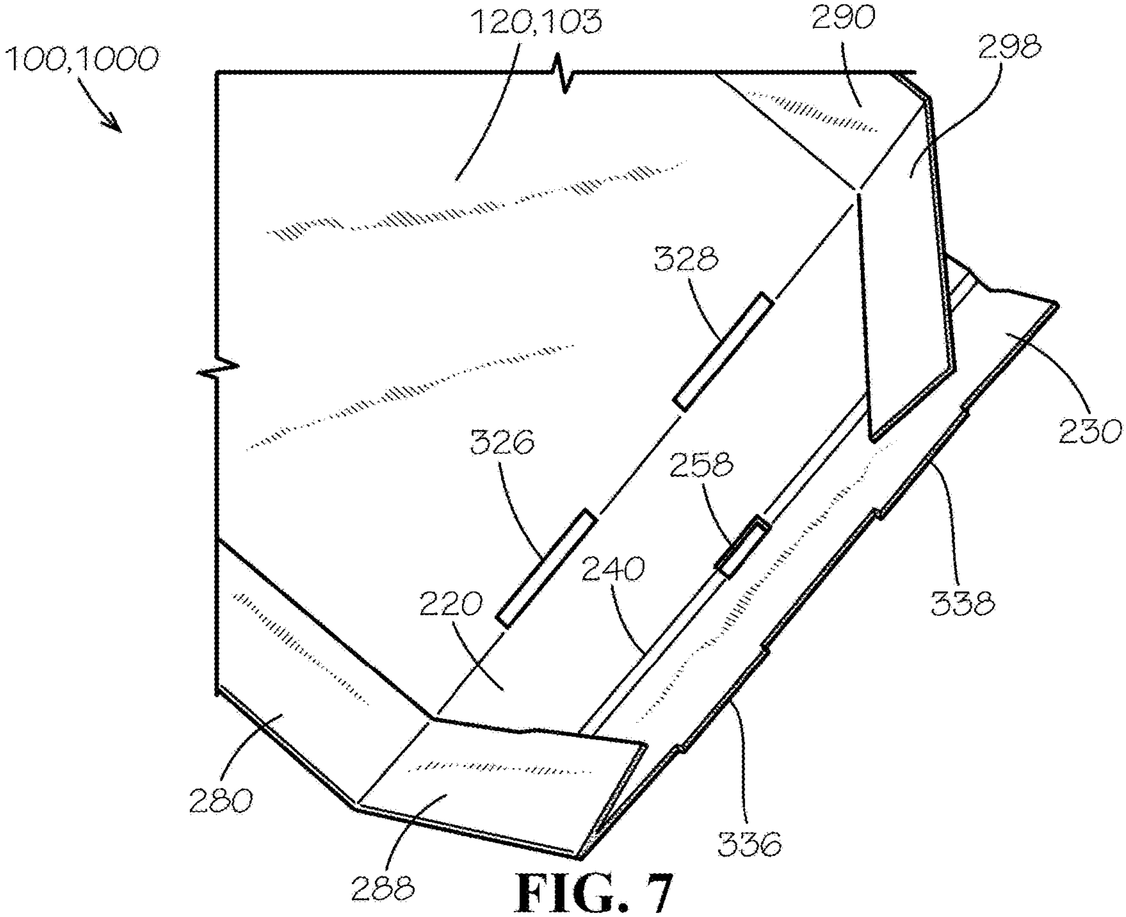
FIG. 7 is a top perspective view of the first end of the second main panel and surrounding structure of the blank of FIG. 1 in a partially assembled condition.

FIG. 7 is a top perspective view of the first end 121 of the second main panel 120 and surrounding structure of the blank 100 of FIG. 1 in a partially assembled condition. As shown, facing the inner surface 103, the bending tabs 288,298 are bent partially inward and the inside end panel 230 is also bent partially inward.

Figure 8:
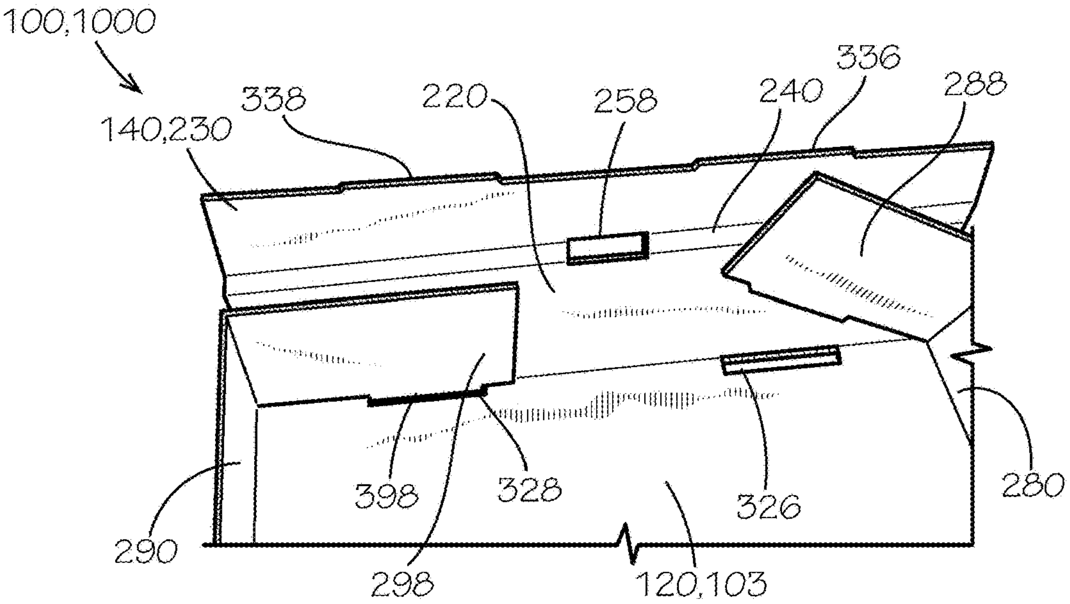
FIG. 8 is a top perspective view of the first end of the second main panel and surrounding structure of the blank of FIG. 1 in a further assembled condition.

FIG. 8 is a top perspective view of the first end 121 of the second main panel 120 and surrounding structure of the blank 100 of FIG. 1 in a further assembled condition. As shown, the bending tabs 288,298 are bent further inward relative to the partially assembled condition shown in FIG. 7 and the second end panel 220 is also bent partially inward towards the bending tabs 288,298. The bending tab 298 and, more specifically, the insertion tab 398, is shown engaged with the opening 328 and the locking opening 258 is again shown in a center of the end panel 140 and the components thereof. As shown, the locking opening 258 shown defined in the bending tab 298 can be defined in a panel such as the connecting panel 240, which can be parallel to a surface of the second main panel 120 of the box bottom. In some aspects, the locking opening 258 can be angled with respect to the second main panel 120 of the box bottom.

Figure 9:
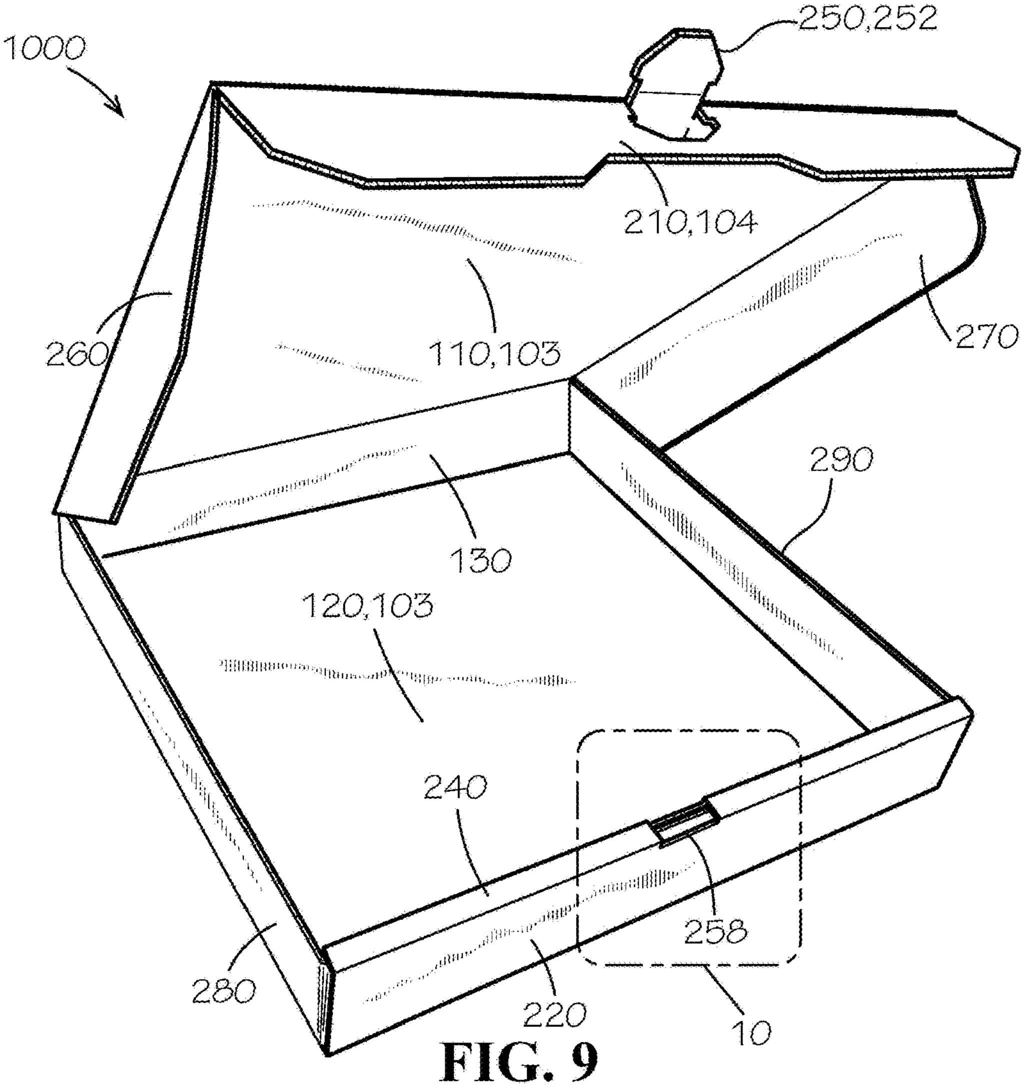
FIG. 9 is a front top perspective view of the assembled box of FIG. 6.

FIG. 9 is a front top perspective view of the assembled box 1000 of FIG. 6. As shown, the box 1000 is full assembled including the box bottom comprising the second main panel 120 and the box top comprising the first main panel 110. Shown bent with respect to the main panels 110,120 are, respectively, the side panels 260,270 and the side panels 280,290. The locking tab 252 is shown partially bent at the bend lines 415,425 in preparation for engagement with the locking opening 258. In some aspects, as shown, the box 1000 can be a rectangular prism defining an overall length, an overall width, and an overall height or thickness. Including when shaped as a rectangular prism, each overall dimension (length, width, or height) can be orthogonal to the other dimensions. In some aspects, the box 1000 can have a shape other than that of a rectangular prism. Specifically, in some aspects, the box 1000 can have a shape of a typical pizza box, and can vary depending on the desired size of pizza to be contained within the box 1000.

Figure 10:
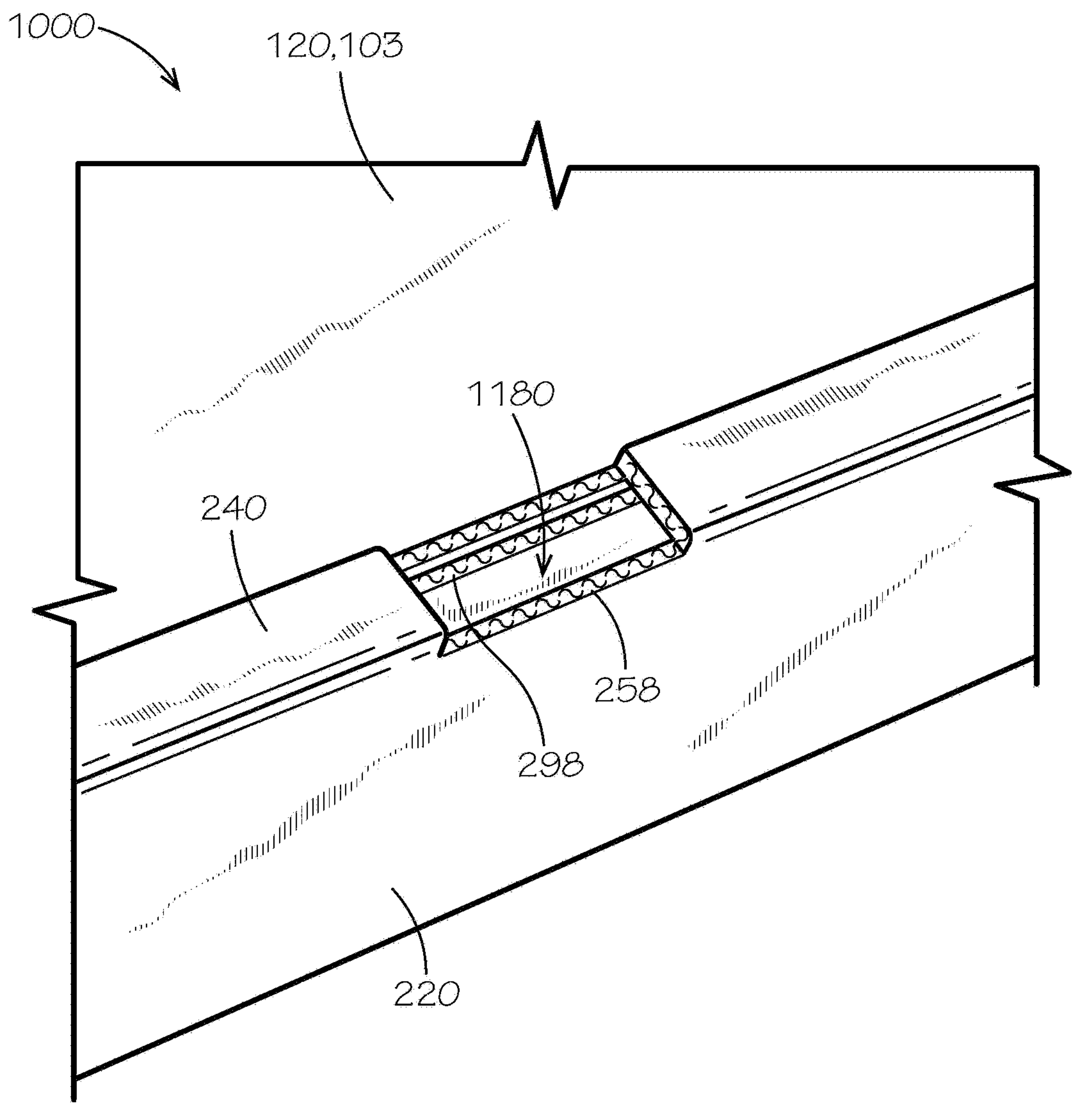
FIG. 10 is a detail perspective view of the assembled box of FIG. 9 taken from detail 10 of FIG. 9.

FIG. 10 is a detail perspective view of the assembled box 1000 of FIG. 9 taken from detail 10 of FIG. 9. One or more elements of the construction of the box 1000 can define a gap 1180 coincident with the locking opening 258 and sized to receive the locking tab 252 (shown in FIG. 9). In some aspects, as shown, the gap 1180 can be defined between the bending tab 298 and the second end panel 220. In some aspects, unfolding forces from one or more bends of the box 1000 can create the gap 1180. In some aspects, for example and without limitation, unfolding forces at a bend line defined at the ends 121,222 (both shown in FIG. 3) —can create the gap 1180 at the opening 352 between the bending tab 298 and the second end panel 220. In some aspects, unfolding forces at other bends can facilitate creation of the gap 1180 shown. In some aspects, the gap 1180 can thus naturally be defined on an outside of the bending tab 298 (i.e., between the bending tab 298 and the second end panel 220) instead of on an inside of the bending tab 298. In some aspects, however, the gap 1180 can be defined between the bending tab 298 and the inside end panel 230. In such aspects, a user of the box can nonetheless insert the locking tab 252 where desired (such as between the bending tab 298 and the second end panel 220) by manipulating the panels of the box 1000 as needed if the construction does not cause the gap 1180 to appear where desired.

Engaged portions of the locking tab 252 and the locking opening 258 can be hidden behind the end panel 140 and, more specifically, the second end panel 220 of the end panel relative to an observer outside of the locking device 250 when the locking device 250 is in an assembled position, wherein hidden means to not be visible to the observer when the panels forming the box 1000 are made from an opaque material. More specifically, any attempt to remove or lift the locking tab 252 will cause the shoulders 425*a,b* of the locking tab 252 to engage and be retained by the locking opening 258. Opening of the box 1000 can thereby result in indications of tampering such as, for example and without limitation, by tearing of separation of the locking tab 252 at the aforementioned perforated connection 411 (shown in FIG. 4) or, in some aspects, tearing of the locking opening 258. As such, the locking device 250 can be a tamper-evident locking device 250 that notifies the recipient of the box 1000 before even opening the box 1000 that the box 1000 was previously opened and any goods contained therein accessed.

Figure 11:
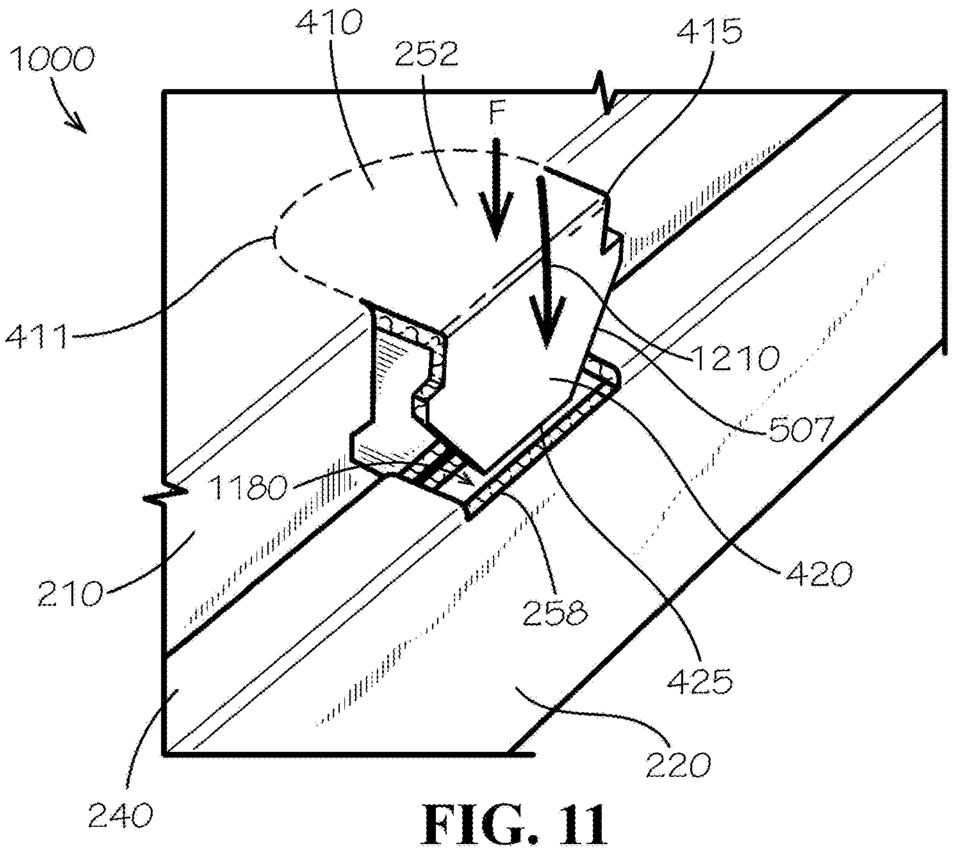
FIG. 11 is a detail side perspective view of the assembled box of FIG. 9 showing the locking device of FIG. 6 before engagement.
Figure 12:
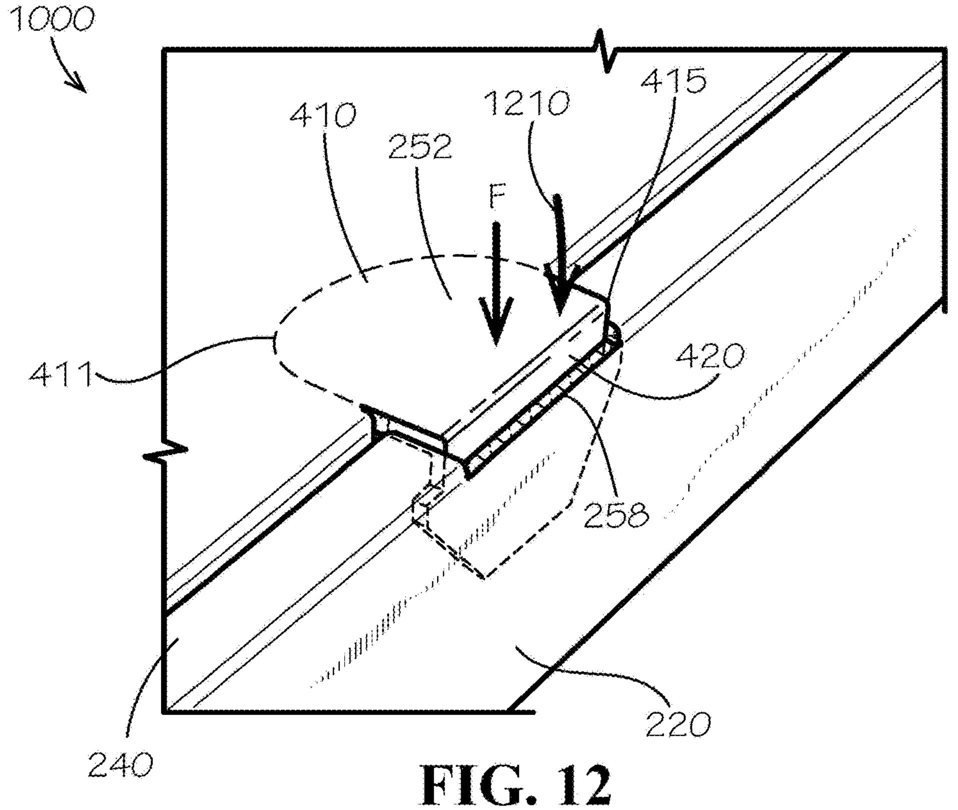
FIG. 12 is a detail side perspective view of the assembled box of FIG. 9 showing the locking device of FIG. 6 during engagement.

FIGS. 11 and 12, respectively, show detail side perspective views of the assembled box 1000 of FIG. 9 showing the locking device 250 of FIG. 5 before and during insertion into the gap 1180 and engagement with the locking opening 258. As shown, the locking tab 252 can be angled with respect to the first main panel 110 of the box top. More specifically, the locking tab 252 can be angled with respect to the first main panel 110 of the box top by an angle of substantially or exactly 90 degrees. The second tab subpanel 420 is shown partially bent down and towards the second main panel 120. As the locking tab 252 is inserted into the gap 1180 in a closing direction 1210 by a force F applied to a surface of the first tab subpanel 410, the second tab subpanel 420 is pressed into the locking opening 258 (as shown in FIG. 12). Because the material forming the blank 100 can be deformable, the lateral width 428 (shown in FIG. 5) of the locking tab 252 defined at the ears 424*a,b* can, at least temporarily, be slightly reduced and the lateral width 528 (shown in FIG. 5) of the locking opening 258 can be slightly increased to facilitate the insertion of the locking tab 252 into the locking opening 258. After insertion, the lateral widths 428,528 can return to their previous conditions, at least sufficient to facilitate locking engagement of the locking tab 252 with the locking opening 258. As shown, the taper 507 defined at the end of the locking tab 252 can facilitate insertion of the locking tab 252 into the locking opening 258. A tendency for each of the one or more ears 424*a,b* of the locking tab 252 to "spring" back to its original size after insertion into the locking opening 258 can keep the locking tab 252 engaged with the locking opening 258 even during jostling of the box 1000 that may be experienced during shipping of the box 1000 and during any attempts to open the box 1000 without breaking off the locking tab 252.

FIG. 13 is a perspective view of the assembled box of FIG. 9 showing the locking device 250 of FIG. 5 after separation of the locking tab 252 from the first main panel 110. In some aspects, upon lifting of the first main panel 110 in an opening direction 1410, which can be optionally facilitated by a pull tab (not shown) defined in the box 1000, the box top comprising the first main panel 110 can separate from the box bottom comprising the second main panel 120 by tearing and separation of the locking tab 252 from the first main panel 110 at the perforated connection 411 now shown torn. Opening the box 1000 in the opening direction 1410 can cause a shearing stress at the perforated connection 411 that exceeds the strength of the perforated connection, thereby resulting in the tearing and separation of the locking tab 252. In some aspects, upon separation of the locking tab 252 from the first main panel 110 at the perforated connection 411 now shown torn—for example and without limitation, by either pushing down or lifting up a portion of the locking tab such as the first tab subpanel 410, optionally with an additional opening not shown to facilitate the pushing down or lifting up—the box top comprising the first main panel 110 can then separate from the box bottom comprising the second main panel 120. In some aspects, opening the box 1000 can comprise lifting the box top with one hand and pushing down or lifting up the locking tab 252 with another hand. As shown, the first main panel 110 and the first end panel 210 can define an opening 1452 matching a shape of the locking tab 252. Up to and including all of the panels of the box 1000 including the side panels 260,270 and the first end panel 210 can be positioned inside the side panels 280,290 in an assembled condition of the box 1000 (to further hide portions of the box 1000 that upon bending might expose the contents of the box 1000).

The blank 100 and the box 1000 and any portion thereof can be formed from a cardboard material such as, for example and without limitation, corrugated cardboard or plastic. The material forming the blank 100 and the box 1000 can be tearable, i.e., it can have sufficiently low tensile strength to be torn during opening of the box with an easily applied opening force. For example, in some aspects, the blank 100 and the box 1000 can be formed from any corrugated material including micro flutes and larger flutes including, for example and without limitation, "A" flute material. More specifically, the blank 100 and the box 1000 can be formed from any range of materials including "F" flute or less (defining a nominal thickness of 1⁄32 inch or 0.8 mm), "E" flute or less (defining a nominal thickness of 1⁄16 inch or 01.6 mm), "B" flute or less (defining a nominal thickness of 1⁄8 inch or 3.2 mm), or "A" flute or less (defining a nominal thickness of 3⁄16 inch or 4.8 mm), and also double-wall and other multi-wall corrugated material. In some aspects, the blank 100 and the box 1000 can be formed from non-corrugated material. In some aspects, for example and without limitation, the blank 100 and the box 1000 can be formed from a material, including paper material, as thin as 10 pt card stock material (defining a nominal thickness of 0.010 inch or 0.254 mm). In some aspects, the perforated connection 411 can be as weak as necessary to ensure that any force to unfold the locking tab 252 internally (i.e., in a space receiving the locking tab 252, including in the gap 1180 and/or the locking opening 258 defined by the box 1000) would result in activating or tearing the perforated connection 411.

A method of assembling the locking device 250 and assembling the box 1000 can comprise folding the side panels 260,270,280,290 with respect to the corresponding main panels 110,120. The method can comprise bending or folding the first end panel 210 with respect to the first main panel 110. The method can comprise bending the bending tabs 288,298 inward into engagement with the second main panel 120 and specifically the openings 326,328 defined in the second main panel 120 or neighboring structure. The method can comprise bending the second end panel 220 with respect to the second main panel 120 into mating or proximate contact with the bending tabs 288,298. The method can comprise bending the inside end panel 230 with respect to both the second main panel 120 and the second end panel 220 into engagement with the second main panel 120 and specifically the openings 326,328. The method can comprise bending the tabs 286,296 inward and in front of the connecting panel 130. The method can comprise bending the connecting panel 130 with respect to the second main panel 120. The method can comprise bending the first main panel 110 with respect to the connecting panel 130 and the second main panel 120. The method can comprise bending the locking tab 252 as described above. The method can comprise inserting the locking tab into the gap 1180 formed by the box 1000 and into locking engagement with the locking opening 258. Inserting the locking tab into the gap 1180 can comprise "snapping" a portion of the locking tab 252 such as the ears 424*a,b* of the second tab subpanel 420 into locking engagement with the locking opening 258. Such "snapping" can occur when the deformed second tab subpanel 420 unsprings slightly upon engagement with the locking opening 258, thereby allowing potential energy created by compression of a portion of the locking tab 252 to be released in the form of movement of the locking tab 252 and, in some cases, contact with an adjacent panel. Movement of the locking tab 252 and any contact with the adjacent panel may be accompanied by an audible noise or by a tactile indication of engagement of the locking tab 252 with the locking opening 258. In some aspects, the box top comprising the first main panel 110 can be hingedly joined and bent with respect to the box bottom comprising the second main panel 120.

In some aspects, as described above, the box top and the box bottom can be formed separately, and the method of assembly can comprise joining the box top and the box bottom without rotating one with respect to the other or without the first main panel 110 joined to the second main panel 120. For example and without limitation, one or more locking tabs 252 can positioned as shown but without the hinged connection or without the box being formed from a single blank, and the one or more locking tabs 252 can be engaged with one or more corresponding panels, each defining a locking opening 258.

A method of assembling and using the box 1000 can comprise obtaining the box top comprising the first main panel 110 and the first end panel 210, at least one of the first main panel 110 and the first end panel 210 defining the locking tab 252, which can be separable from the box top. The method can comprise obtaining the box bottom comprising the second main panel 120 and the second end panel 220, the box bottom defining the locking opening 258. The method can comprise inserting the locking tab 252 into the gap 1180 defined at least in part by the second end panel 220. Inserting the locking tab 252 into the gap 118 can comprise hiding a portion of the locking tab 252 behind the second end panel 220. The method can comprise engaging the locking tab 252 with the locking opening 258.

A method of using the box 1000 can comprise opening the box by lifting the first main panel 110 away from the second main panel 120. The method of use can comprise breaking a perforated connection 411 between the locking tab 252 and neighboring structure such as the first main panel 110. In some aspects, the perforated connection 411 can be broken by only minimal force such that any attempt to open the box by, for example and without limitation, lifting the first main panel 110. The method of use can comprise indicating with a tamper-evident structure such as the broken perforated connection 411 that the box 1000 has been tampered with or, in the case of the user being the consumer or customer, simply opened. Moreover, when the locking tab 252 is engaged, the construction can be such that it is not possible to insert a finger under the locking tab 252 to try to apply a force only to an engaged end of the locking tab 252 such as the distal end 429. In other embodiments, indication of tampering can result from tearing or breaking, with or without defined perforations, of a portion of the box 1000 such as the material around or at ends such as the ends 553,554 the locking opening 258.

Any feature described herein such as, for example and without limitation, the locking tab 252, the locking opening 258, other components of the blank 100 or the box 1000 and their arrangement, can comprise both functional and aesthetic elements, and any feature described as having functional aspects can have or define any one of several aesthetic designs without altering the respective parts' functions. If aesthetic elements are shown in the drawings or possibly fall within the scope of broader claim elements without being directly claimed, such disclosure or claims should not be interpreted as assigning any function to such aesthetic elements which may therefore be separately protectable.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A blank comprising:

a first main panel defining a top outer surface of a box;

a locking tab extending from and separable from the first main panel, the locking tab comprising a neck and an ear, the ear extending from the neck in a lateral direction of the locking tab;

a second main panel connected to the first main panel and facing the first main panel; and an end panel extending from the second main panel, the end panel defining a locking opening, a lateral width of the locking tab at the ear being greater than a lateral width of the locking opening, a lateral width of the locking tab at the neck being less than the lateral width of the locking opening, the locking opening sized to receive and lockably engage at least a portion of the locking tab upon assembly of the blank into the box;

wherein the end panel comprises a second end panel, an inside end panel, and a connecting panel joining the inside end panel to the second end panel, an intersection between the connecting panel and each of the inside end panel and the second end panel defining a bend line; and wherein the locking opening is defined by at least the connecting panel and the inside end panel.

2. The blank of claim 1, wherein the locking opening comprises a rectangular shape.

3. The blank of claim 2, wherein the locking opening comprises a first end, a second end distal from the first end, a third end and a fourth end, both the third end and the fourth end extending between the first end and the second end, wherein the first end is defined by the inside end panel.

4. The blank of claim 3, wherein the second end of the locking opening is defined by the second end panel.

5. The blank of claim 1, wherein the locking tab is joined to the first main panel with a perforated connection.

6. The blank of claim 1, the locking tab comprising a first tab subpanel and a second tab subpanel, the first tab subpanel extending from the first main panel and the second tab subpanel extending from the first tab subpanel and joined to the first tab subpanel, the second tab subpanel comprising the neck and the ear.

7. The blank of claim 6, wherein a distal end of the second tab subpanel of the locking tab is narrower than a maximum lateral width of the second tab subpanel.

8. The blank of claim 6, wherein the second tab subpanel of the locking tab defines a taper.

9. The blank of claim 8, wherein the taper of the second tab subpanel of the locking tab defines a taper angle.

10. The blank of claim 1, wherein the blank is formed integrally from a single piece of material.

11. The blank of claim 1, wherein each of the first main panel and the second main panel defines a first end, a second end distal from the first end, a third end intersecting each of the first end and the second end, and a fourth end distal from the third end, the locking tab extending from the first end of the first main panel, a second end of the second main panel extending from the second end of the first main panel; and the second end panel extending from the first end of the second main panel.

12. The blank of claim 1, wherein the locking tab and the locking opening are positioned on opposite ends of the blank, the locking tab and the locking opening being aligned with each other.

13. A box comprising:

a box top comprising a first panel and a locking tab separably joined to the first panel, the locking tab comprising a neck and an ear, the ear extending from the neck in a lateral direction of the locking tab; and a box bottom comprising a second panel, the second panel defining a locking opening, a lateral width of the locking tab at the ear being greater than a lateral width of the locking opening, a lateral width of the locking tab at the neck being less than the lateral width of the locking opening, the locking opening sized to receive and capture the locking tab, the locking tab configured to engage an edge of the locking opening and thereby configured to prevent movement of the locking tab with respect to the locking opening in an opening direction of the locking tab;

wherein the second panel comprises a second end panel, a connecting panel, and an inside end panel; and wherein the locking opening is defined by at least the connecting panel and the inside end panel.

14. The box of claim 13, wherein the locking opening comprises a first end, a second end distal from the first end, a third end and a fourth end, both the third end and the fourth end extending between the first end and the second end, wherein the first end is defined by the inside end panel.

15. The box of claim 14, wherein the second end of the locking opening is defined by the second end panel.

16. The box of claim 13, wherein the locking tab is joined to the first main panel with a perforated connection.

17. The box of claim 13, the locking tab comprising a first tab subpanel and a second tab subpanel, the first tab subpanel extending from the first main panel and the second tab subpanel extending from the first tab subpanel and joined to the first tab subpanel, the second tab subpanel comprising the neck and the ear.

18. The box of claim 17, wherein a distal end of the second tab subpanel of the locking tab is narrower than a maximum lateral width of the second tab subpanel.

19. The box of claim 17, wherein the second tab subpanel of the locking tab is angled with respect to the first panel of the box in an assembled and closed position of the box.

20. The box of claim 13, wherein the box top and the box bottom are formed from a single blank of material.

* * * * *